United States Patent
Kohli

(10) Patent No.: US 10,586,273 B1
(45) Date of Patent: Mar. 10, 2020

(54) MANAGING COURIERS FOR FAST DELIVERIES

(71) Applicant: Square, Inc., San Francisco, CA (US)

(72) Inventor: Avlok Kohli, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 719 days.

(21) Appl. No.: 14/813,358

(22) Filed: Jul. 30, 2015

(51) Int. Cl.
| | |
|---|---|
| *G06Q 30/06* | (2012.01) |
| *G06Q 10/08* | (2012.01) |
| *G06Q 50/12* | (2012.01) |
| *H04W 4/02* | (2018.01) |

(52) U.S. Cl.
CPC ....... *G06Q 30/0637* (2013.01); *G06Q 10/083* (2013.01); *G06Q 30/0639* (2013.01); *G06Q 50/12* (2013.01); *H04W 4/025* (2013.01)

(58) Field of Classification Search
CPC .................................................. G06Q 30/0637
USPC ....................................................... 705/26–27
See application file for complete search history.

(56) References Cited

U.S. PATENT DOCUMENTS

| | | | |
|---|---|---|---|
| 6,026,375 | A | 2/2000 | Hall et al. |
| 6,324,476 | B1 | 11/2001 | Trovato |
| 8,458,044 | B2 | 6/2013 | Blair et al. |
| 8,504,435 | B2 | 8/2013 | Charles |
| 9,269,103 | B1 | 2/2016 | Kumar et al. |
| 9,466,045 | B1 | 10/2016 | Kumar |
| 9,639,908 | B1 | 5/2017 | Reiss et al. |
| 9,679,489 | B2 | 6/2017 | Lambert et al. |
| 9,754,331 | B1 | 9/2017 | Beckelman et al. |
| 9,811,838 | B1 | 11/2017 | Daire et al. |
| 9,846,086 | B1 | 12/2017 | Robinson et al. |
| 9,858,614 | B2 | 1/2018 | Seaward et al. |
| 10,133,995 | B1 | 11/2018 | Reiss et al. |

(Continued)

FOREIGN PATENT DOCUMENTS

WO      2011/140130 A2      11/2011

OTHER PUBLICATIONS

By Caroline Laganas and, Rich Laden. "Eat in? there's Delivery for that." The Gazette (Colorado Springs, CO), Jun. 25, 2017, p. Business1. ProQuest. (Year: 2017).*

(Continued)

*Primary Examiner* — Michael Misiaszek
*Assistant Examiner* — Latasha D Ramphal
(74) *Attorney, Agent, or Firm* — Mattingly & Malur, PC

(57) ABSTRACT

In some examples, a service provider may receive a plurality of communications indicating buyer accesses to respective item-ordering applications on respective buyer devices. The service provider may determine that the buyer accesses occurred at respective buyer locations outside of a current delivery region. The service provider may determine a cluster of the respective buyer locations, and may further determine, based on the cluster, a recommended courier location for extending the delivery region to include a new area including the cluster. Additionally, in some cases, the service provider may determine a recommended courier location based on a plurality of past delivery locations. Further, in response to receiving an indication of a delivery location from a buyer device, the service provider may determine that a courier is within a threshold delivery travel time to the delivery location prior to providing item information to the buyer device.

20 Claims, 11 Drawing Sheets

(56) References Cited

U.S. PATENT DOCUMENTS

| | | |
|---|---|---|
| 10,181,111 B1 | 1/2019 | Kohli et al. |
| 10,346,889 B1 | 7/2019 | Reiss et al. |
| 2002/0077937 A1 | 6/2002 | Lyons et al. |
| 2002/0138350 A1 | 9/2002 | Cogen |
| 2002/0143655 A1 | 10/2002 | Elston et al. |
| 2002/0178074 A1 | 11/2002 | Bloom |
| 2003/0125963 A1 | 7/2003 | Haken |
| 2005/0058755 A1 | 3/2005 | Chambers |
| 2005/0236478 A1 | 10/2005 | St. Clair et al. |
| 2006/0136237 A1* | 6/2006 | Spiegel ............... G06Q 10/08 705/330 |
| 2006/0121161 A1 | 8/2006 | Garrett |
| 2006/0235754 A1 | 10/2006 | Walker et al. |
| 2006/0293971 A1 | 12/2006 | Hunter et al. |
| 2007/0168118 A1 | 7/2007 | Lappe et al. |
| 2007/0185776 A1 | 8/2007 | Nguyen et al. |
| 2007/0192111 A1 | 8/2007 | Chasen |
| 2008/0052163 A1 | 2/2008 | Koh |
| 2008/0275643 A1 | 11/2008 | Yaqub et al. |
| 2009/0106124 A1 | 4/2009 | Yang |
| 2009/0187488 A1 | 7/2009 | Shamilian |
| 2009/0254445 A1 | 10/2009 | Bennett et al. |
| 2009/0281903 A1 | 11/2009 | Blatsein |
| 2009/0307096 A1 | 12/2009 | Antonellis |
| 2010/0076853 A1 | 3/2010 | Schwarz |
| 2010/0114790 A1 | 5/2010 | Strimling et al. |
| 2011/0055046 A1 | 3/2011 | Bowen et al. |
| 2012/0036028 A1 | 2/2012 | Webb |
| 2012/0173308 A1 | 7/2012 | Brown et al. |
| 2012/0197722 A1 | 8/2012 | Mesaros |
| 2012/0203619 A1 | 8/2012 | Lutnick et al. |
| 2012/0303425 A1 | 11/2012 | Katzin et al. |
| 2013/0006747 A1 | 1/2013 | Wu |
| 2013/0046605 A1 | 2/2013 | Baron et al. |
| 2013/0054323 A1 | 2/2013 | Charles |
| 2013/0080204 A1 | 3/2013 | Khorashadi et al. |
| 2013/0110396 A1 | 5/2013 | Choudhury |
| 2013/0151357 A1 | 6/2013 | Havas et al. |
| 2013/0218727 A1 | 8/2013 | Lutnick et al. |
| 2013/0226651 A1 | 8/2013 | Napper |
| 2013/0246207 A1 | 9/2013 | Novak et al. |
| 2013/0290172 A1 | 10/2013 | Mashinsky |
| 2013/0317940 A1 | 11/2013 | Fitz |
| 2014/0011522 A1 | 1/2014 | Lin et al. |
| 2014/0074743 A1* | 3/2014 | Rademaker ............ G06Q 50/28 705/334 |
| 2014/0089135 A1 | 3/2014 | Linh et al. |
| 2014/0095311 A1 | 4/2014 | Bulloch, Jr. |
| 2014/0164126 A1 | 6/2014 | Nicholas et al. |
| 2014/0180953 A1 | 6/2014 | Westcott et al. |
| 2014/0180959 A1 | 6/2014 | Gillen et al. |
| 2014/0188637 A1 | 7/2014 | Balasubramaniam et al. |
| 2014/0188650 A1 | 7/2014 | Sun et al. |
| 2014/0214465 A1 | 7/2014 | L'Heureux et al. |
| 2014/0222519 A1 | 8/2014 | Swinson et al. |
| 2014/0226487 A1 | 8/2014 | Forssell et al. |
| 2014/0279081 A1 | 9/2014 | Marx et al. |
| 2014/0279667 A1 | 9/2014 | Gillen |
| 2014/0286150 A1 | 9/2014 | Miura |
| 2014/0297470 A1* | 10/2014 | Ramadge ........... G06Q 30/0613 705/26.41 |
| 2014/0310196 A1 | 10/2014 | Yamamura |
| 2014/0343841 A1 | 11/2014 | Faaborg et al. |
| 2014/0370167 A1 | 12/2014 | Garden |
| 2015/0095122 A1 | 4/2015 | Eramian |
| 2015/0112774 A1 | 4/2015 | Georgoff et al. |
| 2015/0178778 A1 | 6/2015 | Lee et al. |
| 2015/0206093 A1 | 7/2015 | Trew et al. |
| 2015/0227888 A1 | 8/2015 | Levanon et al. |
| 2015/0227890 A1 | 8/2015 | Bednarek et al. |
| 2015/0262121 A1 | 9/2015 | Riel-Dalpe et al. |
| 2015/0269521 A1 | 9/2015 | Knapp et al. |
| 2015/0286984 A1 | 10/2015 | Dikman et al. |
| 2015/0294265 A1 | 10/2015 | Monteverde |
| 2015/0324717 A1 | 11/2015 | Lord et al. |
| 2015/0324729 A1 | 11/2015 | Lord et al. |
| 2015/0332215 A1 | 11/2015 | Wilson et al. |
| 2015/0371317 A1 | 12/2015 | Bosko et al. |
| 2016/0019496 A1 | 1/2016 | Gorlin |
| 2016/0048804 A1 | 2/2016 | Paul et al. |
| 2016/0063438 A1 | 3/2016 | Shuken et al. |
| 2016/0071050 A1 | 3/2016 | Kaye |
| 2016/0171591 A1 | 6/2016 | Williams et al. |
| 2016/0196525 A1 | 7/2016 | Kantor et al. |
| 2016/0196528 A1 | 7/2016 | Lemmon |
| 2016/0292664 A1 | 10/2016 | Gilfoyle |
| 2017/0200218 A1 | 7/2017 | Napper |
| 2018/0022405 A1 | 1/2018 | Gecchelin et al. |
| 2018/0047242 A1 | 2/2018 | Lutnick et al. |

OTHER PUBLICATIONS

Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.

Kauffman, R.J., and Wang, B., "Bid Together, Buy Together: On the Efficacy of Group-Buying Business Models in Internet-Based Selling," Carlson School of Management, last revised on May 16, 2001, pp. 1-44.

Non-Final Office Action dated May 26, 2015, for U.S. Appl. No. 14/625,680, of Kumar, A.R., et al., filed Feb. 19, 2015.

Non-Final Office Action dated Jun. 24, 2015, in U.S. Appl. No. 14/663,671, of Reiss, J.L., et al., filed Mar. 20, 2015.

Notice of Allowance dated Nov. 6, 2015, for U.S. Appl. No. 14/625,680, of Kumar, A.R., et al., filed Feb. 19, 2015.

Final Office Action dated Dec. 24, 2015, in U.S. Appl. No. 14/663,671, of Reiss, J.L., et al., filed Mar. 20, 2015.

Advisory Action dated Mar. 9, 2016, in U.S. Appl. No. 14/663,671, of Reiss, J.L., et al., filed Mar. 20, 2015.

Non-Final Office Action dated Oct. 6, 2016, for U.S. Appl. No. 14/663,671, of Reiss, J.L., et al., filed Mar. 20, 2015.

Notice of Allowance dated Dec. 22, 2016, for U.S. Appl. No. 14/663,671, of Reiss, J.L., et al., filed Mar. 20, 2015.

Non-Final Office Action dated Nov. 9, 2017, for U.S. Appl. No. 14/625,673, of Reiss, J.L., et al., filed Feb. 19, 2015.

Non-Final Office Action dated Jan. 11, 2018, for U.S. Appl. No. 14/625,683, of Kumar, A.R., et al., filed Feb. 19, 2015.

Non-Final Office Action dated Jan. 18, 2018, for U.S. Appl. No. 14/985,267, of Rhodes, M., et al., filed Dec. 30, 2015.

Non-Final Office Action dated Jan. 26, 2018, for U.S. Appl. No. 14/838,446, of Kohli, A., filed Aug. 28, 2015.

Non-Final Office Action dated Feb. 1, 2018, for U.S. Appl. No. 14/993,149, of Kohli, A., et al., filed Jan. 12, 2016.

Non-Final Office Action dated Feb. 28, 2018, for U.S. Appl. No. 14/642,875, of Reiss, J.L., et al., filed Mar. 10, 2015.

Non-Final Office Action dated Mar. 8, 2018, for U.S. Appl. No. 14/663,678, of Reiss, J.L., et al., filed Mar. 20, 2015.

Non-Final Office Action dated Apr. 3, 2018, for U.S. Appl. No. 14/926,056, of Bernstein, B.R., et al., filed Oct. 29, 2015.

Notice of Allowance dated Jun. 25, 2018, for U.S. Appl. No. 14/625,673, of Reiss, J.L., et al., filed Feb. 19, 2015.

Non-Final Office Action dated Jul. 13, 2018, for U.S. Appl. No. 14/710,808, of Reiss, J.L., et al., filed Oct. 29, 2015.

Final Office Action dated Jul. 23, 2018, for U.S. Appl. No. 14/663,678, of Reiss, J.L, et al., filed Mar. 20, 2015.

Notice of Allowance dated Sep. 6, 2018, for U.S. Appl. No. 14/993,149, of Kohli, A., et al., filed Jan. 12, 2016.

Final Office Action dated Oct. 17, 2018, for U.S. Appl. No. 14/926,056, of Bernstein, B.R., et al., filed Oct. 29, 2015.

Non Final Office Action dated Dec. 17, 2018, for U.S. Appl. No. 14/663,678, of Reiss, J.L., et al., filed Mar. 20, 2015.

Advisory Action dated Jan. 29, 2019, for U.S. Appl. No. 14/926,056, of Bernstein, B.R., et al., filed Oct. 29, 2015.

Notice of Allowance dated Feb. 25, 2019, for U.S. Appl. No. 14/710,808, of Reiss, J.L. et al., filed May 13, 2015.

(56) References Cited

OTHER PUBLICATIONS

EIC 3600 Search Report dated Feb. 25, 2019, for U.S. Appl. No. 14/710,808, of Reiss, J.L. et al., filed May 13, 2015.
Final Office Action dated Nov. 16, 2018, for U.S. Appl. No. 14/813,358, of Kohli, A., filed Jul. 30, 2015.
Non Final Office Action dated Apr. 4, 2019, for U.S. Appl. No. 14/813,358, of Kohli, A., filed Jul. 30, 2015.
"GPS Comes To High-Tech Pizza-Delivery Tracking; One Papa John's chain lets customers track their deliveries street by street. Domino's, meanwhile, is making its own tracking technology push," CMP Media, Inc., pp. 1-2 (Feb. 1, 2008).
Notice of Allowance dated Jun. 12, 2019, for U.S. Appl. No. 14/663,678, of Reiss, J.L., et al., filed Mar. 20, 2015.
Non Final Office Action dated Jul. 30, 2019, for U.S. Appl. No. 15/496,040, of Reiss, J.L., et al., filed Apr. 25, 2017.

* cited by examiner

MANAGING COURIERS FOR FAST DELIVERIES

BACKGROUND

People may sometimes be at a location where they want food, but are not able to go to a restaurant or store. Accordingly, they may want to have food delivered to them. To meet this demand, a courier may obtain food prepared by a restaurant and deliver the food to a customer at a delivery location. For example, a service may enable customers to order food items, and may arrange for couriers to deliver the food items to the customers. However, conventional food deliveries can take a relatively long time between the time at which the customer places the order and the time at which the food is delivered to the customer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
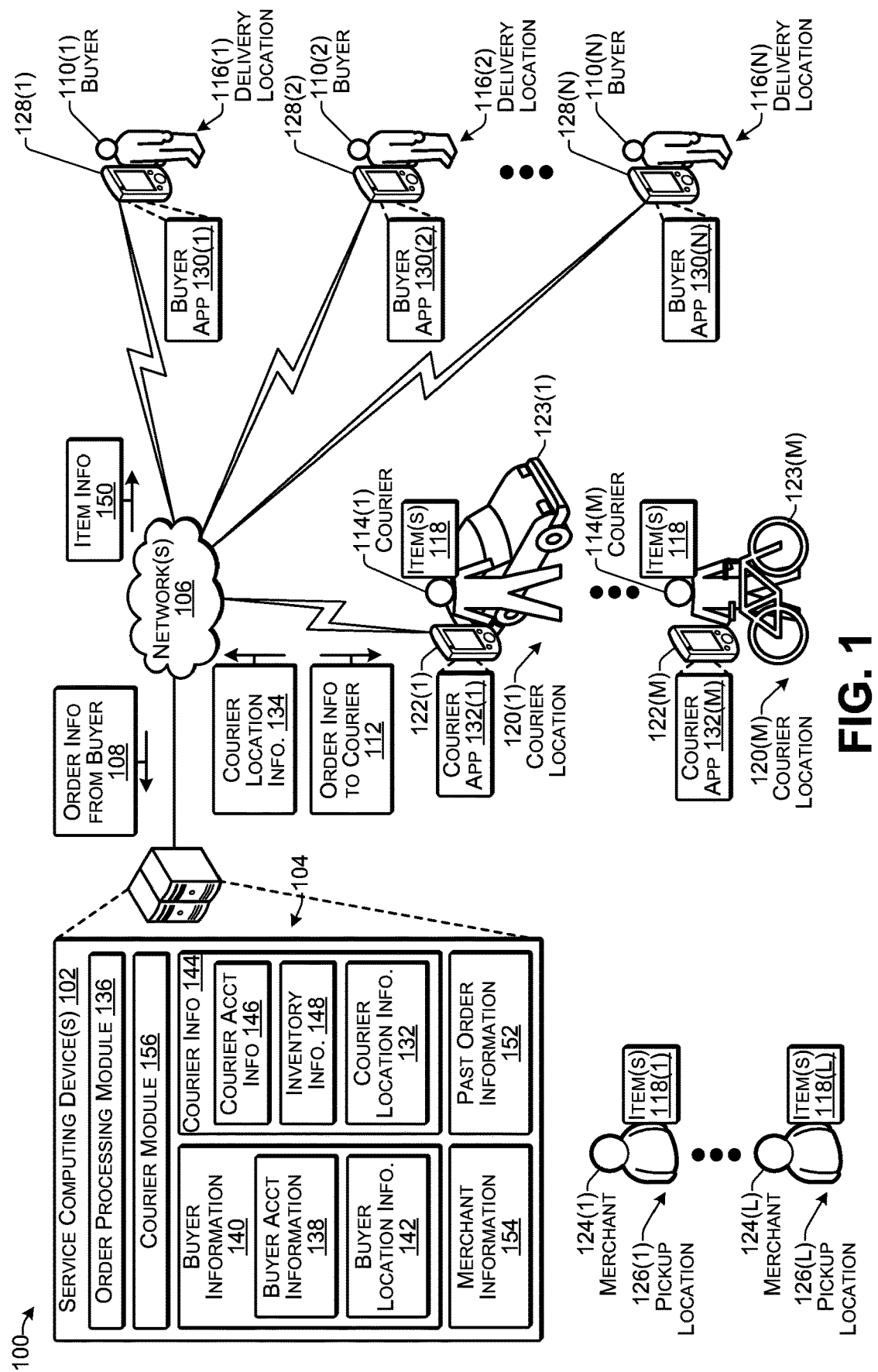
FIG. 1 illustrates an example system for a delivery service that utilizes couriers according to some implementations.

The technology herein provides a novel system that enables people to participate as couriers in a new type of crowdsourced service economy. With the technology herein, essentially any person with a mobile device is able to almost immediately become a courier, or cease to be a courier, in a courier network that provides services for delivery of items to buyers. Additionally, through the interaction of a plurality of computing devices, mobile devices, and location sensors that make up the system, some examples herein are able to determine optimal placement locations and inventory for the couriers, while enabling dynamic creation of delivery zones for fast delivery of items to buyers.

In some examples, a service provider may provide a delivery service that enables buyers to order items, such as food items, that are delivered by couriers. For instance, an item may typically be delivered to a buyer within a relatively short threshold time (e.g., 5-15 minutes) that is substantially less than conventional delivery times. As one example, the items may have already been procured by the couriers and can therefore be delivered quickly by the couriers based on the couriers being stationed proximal to predicted buyer locations. For instance, a courier may pick up a plurality of a particular type of item from a merchant in advance of receiving any buyer orders. The courier may then travel to a location indicated by the service provider and wait for buyers to place orders. For instance, the service provider may determine the recommended location based on past orders received through the buyer application or based on other buyer application events, such as buyers opening the application but being outside a current delivery area.

A buyer may use a buyer application on a buyer device, such as a mobile device or other computing device, to determine the items currently available for delivery. When the buyer opens the buyer application, the service provider may determine whether a courier is within a threshold delivery travel time of the buyer's delivery location, and if so, may determine the current inventory of the courier. Based on the available inventory of the courier that is within the threshold delivery travel time of the buyer, the service provider may send item information to the buyer device. The item information received by the buyer device may cause the buyer application on the buyer device to indicate that one or more of the items in the courier's inventory are available for delivery. For example, if the courier currently has an inventory of five burritos, the buyer application may indicate to the buyer that one or more burritos are available for delivery within a threshold time based at least in part on determining the delivery travel time from the courier to the buyer's delivery location.

In addition, the delivery zones for particular buyers may change dynamically based on the availability and/or inventory of the couriers currently in an area proximate to the particular buyers. For example, if there are no couriers currently within a threshold delivery travel time of a particular buyer, the application on the buyer's mobile device may indicate that the no items are currently available. Thus, the buyer is treated as being outside of any current delivery zones. This indication of unavailability may continue until such time as a courier having one or more items is within a threshold delivery travel time of the particular buyer's delivery location, thus ensuring that when the buyer orders an item, the delivery will be completed within the threshold time period for delivery. In some examples, the buyer may be able to place an advance order for an item if the buyer is within a threshold delivery travel time of a location at which a courier will be stationed in the future.

In some cases, a new delivery area may be dynamically created if there are a sufficient number of application open events within a threshold distance of one another in an area of a region that is not currently being serviced. For instance, if there are a threshold number of application open events taking place within a threshold time of one another in a neighborhood of a city that is not currently being serviced, the service may allocate a courier to that neighborhood based on the detection of the application open events. The threshold distance may be based in part on the threshold delivery travel time, such as a distance corresponding to less than double the threshold delivery travel time. Further, clustering techniques may be used to determine a cluster of application open event locations and to determine an optimal courier placement location with respect to the cluster of locations.

In addition, in some examples, a courier may perform courier services for one or more other types of delivery services while also performing courier services for fast delivery of food items. As one example, the service provider may also offer a service that enables buyers to order items from restaurant menus, and may pay couriers to deliver the ordered items to the buyers. Thus, a particular courier may act in both capacities, e.g., by picking up a plurality of first items from a first merchant for fast delivery to customers who have not yet placed orders, and the courier may also pick up an order placed by a first buyer for a menu item from the first merchant or from a different merchant. For instance if the first buyer's delivery location is near to a location at which the particular courier will be stationed to wait for orders for fast delivery, the courier may deliver the menu item to the first buyer, and may then wait for orders for the first items for fast delivery to other buyers.

As another example, a first courier may serve as an item pick up source for a plurality of other couriers. For instance, the first courier may pick up 50 items from a merchant and may drive the items to an indicated service area where a large number of orders are predicted to be received. Several other couriers may then meet the first courier at the indicated location, may each pick up a share of the 50 items from the first courier, and deliver the items as orders are received from buyers.

In the examples herein, an order may include a request submitted by a buyer (e.g., a customer) for the acquisition of a food item from a courier. The order information may be received by the service provider and may be sent by the service provider to the courier. A merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases an item delivered by a courier. Buyers may include customers and potential customers. The service provider may provide payment to the merchant for the picked up items, provide payment to the courier for delivering the items, and may receive payments from the buyers for the delivered items.

For discussion purposes, some example implementations are described in the environment of managing couriers in a courier network based in part on predicted delivery locations of buyers. However, implementations herein are not limited to the particular examples provided, and may be extended to other service environments, other system architectures, other techniques for determining courier placements, and so forth, as will be apparent to those of skill in the art in light of the disclosure herein.

FIG. 1 illustrates an example system 100 for management of couriers to enable fast deliveries of items according to some implementations. The system 100 includes one or more service computing devices 102 of a service provider 104 that may receive, over one or more networks 106, order information 108 from one or more of a plurality of buyers 110(1), 110(2), . . . , 110(N). The order information 108 may include information about at least one order placed by at least one of the buyers 110. Based on the order information 108 received from a particular buyer 110, the service computing device 102 may send order information 112 to a selected courier 114 of a plurality of couriers 114(1)-114(M). For instance, the selected courier 114 may be within a threshold delivery travel time of a buyer delivery location 116 of the particular buyer. As one example, when a buyer 110(1), 110(2), . . . , 110(N) wishes to place an order, the service computing device 102 may first determine a respective delivery location 116(1), 116(2), . . . , 116(N) of the respective buyer 110(1), 110(2), . . . , 110(N) to which the order is to be delivered. Further, in addition to being within a threshold delivery travel time of the buyer's delivery location 116, the selected courier 114 may be selected based on having an inventory of one or more available items 118 that may be used to fulfil an order of the particular buyer 110.

Additionally, a respective courier location 120(1)-120(M) of each respective courier 114(1)-114(M) may be determined from a GPS receiver associated with a respective courier device 122(1)-122(M), or from other suitable location sensors. A courier 114 whose courier location 120 is within the threshold delivery travel time of the buyer's delivery location 116 may be selected for fulfilling the order. The service provider may send the order information 112 for the order to the courier device 122 of the selected courier 114. In response, the selected courier may respond by acknowledging receipt of the order information and by proceeding to the delivery location 116 specified in the order information 112. For example, the order information 112 may include at least the delivery location 116 associated with the particular buyer 110, and the number of items 118 to be delivered to the particular buyer 110. Further, at least some of the couriers 114(1)-114(M) may use vehicles 123(1)-123(M) when making deliveries. Examples of vehicles 123 may include bicycles, scooters, motorcycles, cars, skateboards, and so forth. In some cases, the type of vehicle 123 associated with a courier may be taken into consideration when determining delivery travel times.

In some examples, merchants 124(1)-124(L) may each offer one or more respective items 118(1)-118(L). Respective couriers 114 may pick up a plurality of the items 118 for delivery to buyers 110. For instance, each merchant 124(1)-124(L) may be associated with a respective pickup location 126(1)-126(L), which may typically be the merchant's place of business, at which a courier 114 may pick up a plurality of the items 118 from the respective merchant 124. The number of items 118 picked up by each courier 114 may be based at least in part on a prediction that a sufficient number of buyers 110 in a certain delivery area will place orders for the picked up items 118 before the items 118 spoil. For instance, a spoilage time may be associated with each item 118. The spoilage time may be the time between when an item 118 is ready to be picked up from the merchant and when the item 118 is considered to be of degraded quality, e.g., cold, soggy, melted, wilted, oxidized, or otherwise less palatable than would be normally expected by the buyer. As discussed additionally below, the system 100 herein may include item transportation containers (not shown in FIG. 1) having insulation and temperature control devices for extending the spoilage times of particular items 118.

In the illustrated example, the service computing device 102 of the service provider 104 is able to communicate with the courier devices 122(1)-122(M) over the one or more networks 106. In addition, the buyers 110(1), 110(2), . . . , 110(N) may be associated with respective buyer devices 128(1), 128(2), . . . , 128(N) that may execute respective instances of buyer applications 130(1), 130(2), . . . , 130(N). For example, buyers 110 may use the buyer devices 128, such as smart phones, tablet computers, wearable computing devices, laptops, desktops, or the like, and these buyer devices 128 may have installed thereon the buyer application 130. The buyer application 130 may enable the respective buyer 110 to purchase one or more of the items 118 to be delivered to the buyer 110 by one of the couriers 114. For example, the buyer application 130 may present one or more GUIs on a display of the buyer device 128 for enabling the buyer 110 to select and order the item 118.

In some examples, the buyer application 130 may enable the buyer 110 to make a payment for an order using the buyer application 130. For instance, the service provider 104 may charge a buyer account associated with the buyer 110 for an amount corresponding to a particular order. In some examples, the buyer application 130 and the service computing device 102 may communicate with each other via one or more APIs (application programming interfaces). Additionally, or alternatively, the buyer application 130 may include a web browser, or the like, and the buyer 110 may navigate to a website associated with the service provider 104. In this case, the buyer 110 may use the website associated with the service provider 104 to place an order, and the website may provide at least some of the functionality attributed to the buyer application 130 herein.

In addition, the couriers 114(1)-114(M) may be associated with the respective courier devices 122(1)-122(M) that may each execute respective instances of courier applications 132(1)-132(M). For example, the couriers 114 may use respective courier devices 122, such as smart phones, tablet computers, wearable computing devices, laptops, or the like, and these courier devices 122 may have installed thereon the courier application 132. The courier application 132 may be configured to receive the order information 112 from the service computing device 102 to provide a particular courier 114 with information for delivering a particular order to a buyer delivery location 116. The courier application 132 may further enable the courier 114 to respond to the service computing device 102 to confirm acceptance of a delivery job and to subsequently provide an indication of completion of a delivery job when the delivery has been made.

Additionally, the courier application 132 may provide the service computing device 102 with an indication of a current location of a particular courier device 122. For instance, one or more location sensors associated with each courier device 122 may provide location information to the courier application 132. Based on this location information, the courier application 132 may send location information 134 to the service computing device 102, such as by providing an indication of a geographic location of each courier device 122 of each active courier 114. Thus, a subset of courier devices 122 associated with active couriers may communicate with the service computing device 102, and may send location information 134 obtained from one or more location sensors associated with each courier device 122, such as a respective GPS receiver (not shown in FIG. 1). In some cases, another subset of courier devices 122 associated with inactive couriers may be periodically pinged by the service computing device 102 to determine interest in becoming active and, if so, requesting current location information of the associated inactive courier. Inactive couriers who are interested in being activated may allow their courier devices 122 to respond with their location information, while those who are not interested in being activated may keep their location information private by not responding. In some examples, the courier application 132 and the service computing device 102 may communicate with each other via one or more APIs. Alternatively, in other examples, the courier device 122 may receive the order information 112 via an SMS text message, a voicemail, a telephone call, or the like.

The one or more networks 106 can include any appropriate network, including a wide area network, such as the Internet; a local area network, such an intranet; a wireless network, such as a cellular network; a local wireless network, such as Wi-Fi; close-range wireless communications, such as BLUETOOTH® and BLUETOOTH® low energy; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail. Accordingly, the service computing device 102, the buyer devices 128, and the courier devices 122 are able to communicate over the one or more networks 106 using wired or wireless connections, and combinations thereof.

In the illustrated example, the service computing device 102 includes an order processing module 136 that may be executed by the service computing device 102 to provide, at least in part, the order processing functionality attributed to the service computing device 102. The order processing module 136 may receive the order information 108 from the buyers 110 and may associate the order information 108 with buyer account information 138 stored with buyer information 140 that is maintained by the service computing device 102. For instance, based on buyer identifying information that may be included with the order information 108, such as a buyer account identifier, a buyer name, or the like, the order processing module 136 may associate particular order information 108 with a particular buyer account in the buyer account information 138. The order processing module 136 may access a buyer account included in the buyer account information 138 to charge a particular buyer account for a particular order.

Furthermore, the order information 108 received from the buyer may indicate buyer location information 142. For example, the buyer location information may be determined by the buyer application 130 from a GPS receiver associated with the buyer device 128. The buyer application 130 may use this location information as the delivery location 116 for a particular order. In other examples, the buyer 110 may manually enter an address into the buyer application 130 that may be used as the delivery location 116 for an order. The buyer application 130 may store the delivery location 116 used for a past order so that the buyer 110 does not have to reenter the delivery location for a subsequent order. In some examples, the buyer application 130 may use the location information from the GPS receiver on the buyer device 128 to confirm that an assumed delivery location for a current order corresponds to a previously entered delivery location. If there is a discrepancy, the buyer application 130 may request that the buyer select a delivery location prior to presenting other user interfaces to the buyer.

Additionally, if a particular buyer 110 is located outside of a current delivery region when the buyer 110 opens the buyer application 130, the buyer application 130 may send the buyer's current location to the service computing device 102. The service computing device 102 may store the buyer's current location in association with an "application open event" even though there is not an order associated with the buyer's current location. The buyer's current location outside of the delivery region may be correlated with other application open events received from other buyer devices 128 that are within a threshold distance of one another. If the service computing device 102 receives a sufficient number of application open events in a sufficient density in an area outside of a current delivery region, the service computing device 102 may dynamically extend the delivery region to include the area outside of the current delivery region such as by selecting one or more couriers 114 to provide delivery services to this area.

In addition, prior to accepting an order from a buyer 110, the order processing module 136 may determine that at least one courier 114 is within a threshold delivery travel time of the delivery location 116 of the particular buyer 116, and that the at least one courier 114 has an inventory of one or more items 118 available to fulfill an order of the particular buyer 116. For example, when a buyer 110 opens the buyer application 130, the order processing module 136 may determine a current courier location 120(1)-120(M) associated with each courier 114(1)-114(M). Furthermore, the order processing module 136 may determine which of these couriers 114(1)-114(M) are within a threshold distance, or otherwise within a threshold delivery travel time, of the anticipated delivery location 116 of the particular buyer 110. As an example, the threshold distance may be determined based on how far a courier is predicted to be able to travel within 10-15 minutes or less, e.g., whether the courier travel time will take more than 10-15 minutes for the particular courier 114 to arrive at the delivery location 116 of the particular buyer. If so, then the courier 114 is treated as being outside of the threshold distance from the particular buyer 110.

Furthermore, of the couriers 114 that are determined to be within the threshold delivery travel time of the particular buyer 110, the order processing module 136 may determine a current inventory of each of these couriers 114. For instance, the courier information 144 maintained by the service computing device 102 may include courier account information 146, courier inventory information 148, and the courier location information 134. When the buyer 110 opens the buyer application 130, such as for placing an order, the order processing module 136 may determine that there is currently at least one courier 114 within a threshold delivery travel time of the buyer and that the courier currently has at least one item 118 in the courier's inventory.

Based on determining that there is a courier 114 having one or more items 118 and further determining that the courier 114 is within a threshold delivery travel time of the buyer 110, the order processing module 136 may send item information 150 to the particular buyer device 128. The item information 150 may indicate a number of items that are currently available in the inventory of a courier 114 that is within the threshold delivery travel time of the particular buyer 110. Accordingly, the inventory information 148 may keep track of how many items 118 each courier 114 currently has in the respective courier's inventory. Furthermore, if there are multiple couriers 114 within the threshold delivery travel time of the particular buyer 110, the item information 150 may include information about the items 118 in the respective inventories of each of the multiple couriers 114. For instance, one courier 114 may have an inventory of a first type of item, such as burritos, while another courier 114 may have an inventory of a second type of item, such as salads, sandwiches, etc. Alternatively, both couriers may have inventories of the same type(s) of items. In response to receiving the item information 150, the buyer application 130 may present one or more user interfaces to enable the buyer 110 to place an order for a number of items 118 up to the total number of items currently available in the particular courier's inventory.

In response to receiving an order from a buyer device 128, the order processing module 136 may send the order information 112 to the particular courier 114 that was determined to be within the threshold delivery travel time of the buyer's delivery location 116. For instance, the order information 112 may request that the particular courier 114 deliver the ordered item(s) 118 to the particular buyer's specified delivery location 116. Furthermore, the order processing module 136 may change the inventory information 148 associated with the selected courier 114 to subtract the number of items ordered by the particular buyer 110 from the current inventory of the selected courier 114.

The selected courier 114 may use the courier application 132 on the courier device 122 to receive a message with order information 112, and to respond with a reply message indicating acceptance of the delivery job. The selected courier 114 may subsequently deliver the ordered item(s) 118 to the particular buyer 110 at the indicated delivery location 116. When the courier 114 has completed delivery of the item(s) 118 to the delivery location 116, the courier 114 may use the courier application 132 to inform the order processing module 136 that the delivery has been completed. The order processing module 136 may access a courier account included in the courier account information 146 for the selected courier 114 to credit the courier account of the selected courier 114 with payment for the delivery job.

The order processing module 136 may store information associated with each order as past order information 152. For instance the past order information 152 may include a day of the week, date, and time of day at which each order is received from the respective buyer 110 and delivered to the respective delivery location 116. The past order information 152 may further include, for each order: buyer identifying information; item(s) ordered; merchant identifying information; the merchant pickup location 126; the delivery location 116; location 120 of the courier when the courier accepted the job for delivery of the order; time that the courier arrived at the delivery location; time that the courier left the delivery location; amount paid for the order; any feedback from the buyer, including any complaints or indications of item spoilage; as well as other information, as discussed additionally below.

Furthermore, the service computing device 102 may maintain merchant information 154, which may include various information about the merchants 124 from which the items 118 are obtained. For instance, the merchant information 154 may include merchant account information, a number of items obtained by the couriers 114 from each merchant 124 on each date, amount paid to each merchant for each item, as well as other information regarding the merchants 124, as discussed additionally below. As one example, the service provider 104 may provide electronic payment to the respective merchants 124 based on the number of items picked up by the couriers from the respective merchants 124.

The service computing device 102 may further include a courier module 156 that may be executed by the service computing device 102 to determine a recommended number of the items 118 for the respective couriers 114 to pick up from a particular merchant 124 at a particular time, and to determine optimal locations for stationing respective couriers 114 after the couriers 114 have picked up a quantity of items 118. As one example, the courier module 156 may determine a number of orders received in the past in a particular area of a service region on a particular day, such as on weekday or weekend day, and during a corresponding time period, e.g., lunch time, dinner time, etc. For instance, if the past order information 152 indicates that an average of 20 orders for items 118 are typically placed on weekdays during lunch time in a particular neighborhood, the courier module 156 may recommend that two couriers acquire 10 items each and go to the particular neighborhood in anticipation of receiving orders for the items.

As another example, if a threshold number of application open events have been received from a particular neighborhood that is not within the current service region, the courier module 156 may recommend that a courier acquire a quantity of items 118 and go to the particular neighborhood based on the prediction that orders will be received for the particular items. In some examples, the quantity of items recommended to be picked up by each courier may be based at least in part on the predicted spoilage time of the items 118. For instance, items 118 having a longer spoilage time may be picked up in larger quantities than items having shorter spoilage times. Additional functions of the courier module 156 are discussed below.

Figure 2:
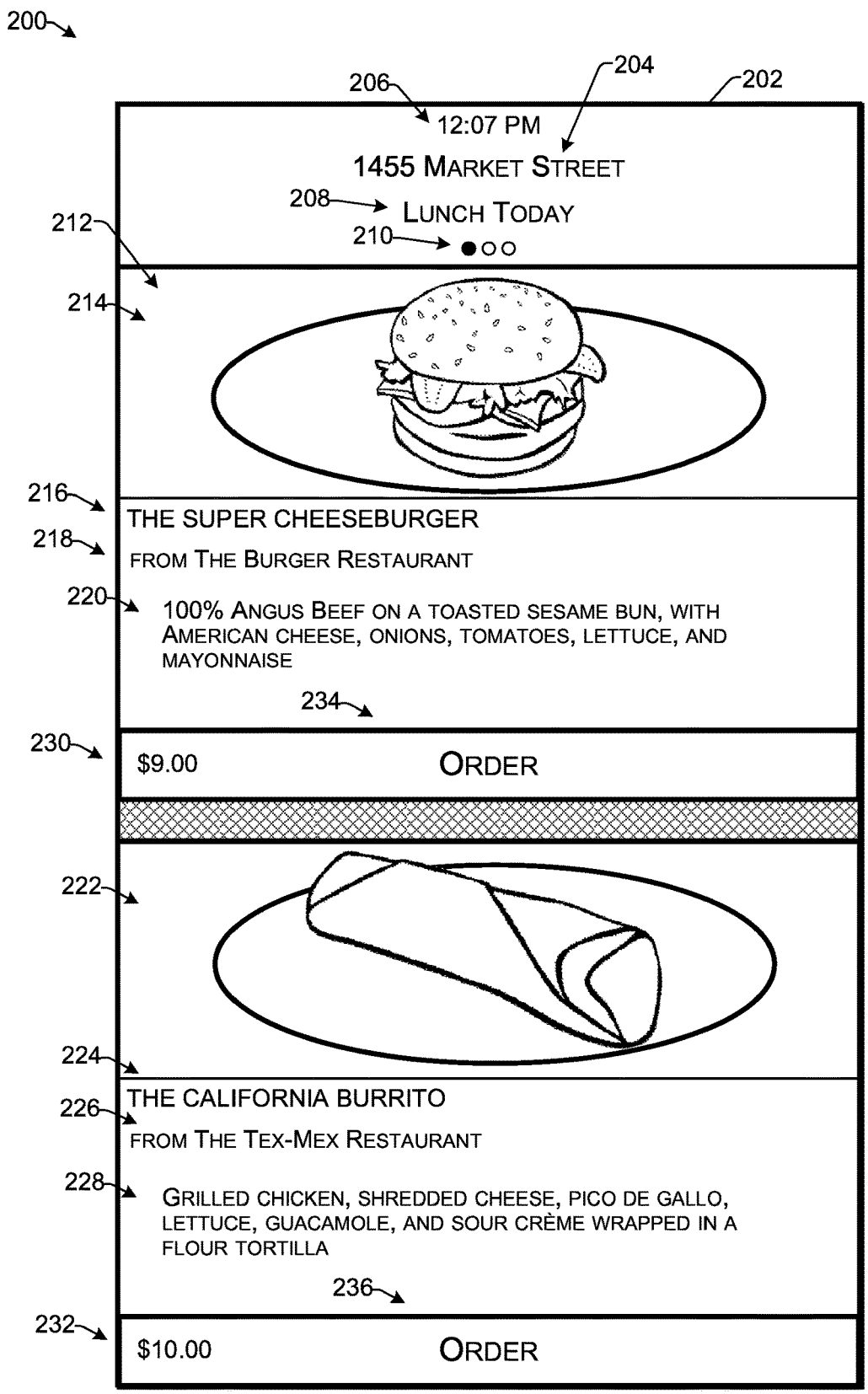
FIG. 2 illustrates an example user interface for enabling a buyer to place an order according to some implementations.

FIG. 2 illustrates an example graphic user interface (GUI) 200 for presenting item information on a display 202 associated with the buyer device 128 according to some implementations. The GUI 200 presents information about one or more items that may be selected for delivery to enable a buyer to use the buyer device 128 to place an order for one or more of the items. The GUI 200 includes an indicated delivery location 204, such as an address to which the buyer's order is to be delivered. In some examples, the delivery location 204 may be determined by the buyer application based on a current location of the buyer device 128, as indicated, e.g., by one or more location sensors included in the buyer device 128. For example, the current location may be determined from GPS information provided by an onboard GPS receiver, and/or from wireless access point information, cell tower information, or the like, determined through one or more communication interfaces, and/or through various other techniques.

In some examples, the delivery location 204 may be entered manually by the buyer, may have been previously used by the buyer, and/or may be a default location that may be changed by the buyer through interaction of the buyer with the GUI 200. As mentioned above, in some examples, the items available for delivery may change based on the indicated delivery location 204. Accordingly, the buyer application may determine the indicated delivery location 204 prior to presentation of the item information.

The GUI 200 further includes a current time 206, and an indication 208 that the user is ordering for a current delivery period, which is lunch time in this example. Further, the GUI 200 includes an indicator 210 that the user may swipe the screen view items available at other delivery periods, such as dinner time or lunch tomorrow. In some cases, various different items obtained from different merchants may be available based on the time of day and day of the week.

In the illustrated example, the GUI 200 presents item information 212 about two items. In some cases, the couriers herein may typically only have one or two types of items in inventory. The item information 212 includes a representative image 214 and a name 216 of a first item, e.g., "The Super Cheeseburger". The item information for the first item may further indicate the merchant name 218, e.g., "The Burger Restaurant", and a description 220 of the first item. In addition, the item information for the second item may include a representative image 222, and a name 224 of the second item, e.g., "The California Burrito". The item information for the second item may further include the merchant name 226, e.g., "The Tex-Mex Restaurant", and a description 228 of the second item. Further, while information about two items is presented in this example, information about other items, if currently available for delivery, may be presented in the GUI 200 by the buyer scrolling or otherwise traversing through the item information.

In the GUI 200 of this example, the current time 206 is indicated to be 12:07 PM. By default, the buyer application may be configured to assume that the buyer wishes to order an item for delivery as soon as possible, rather than at some point later in the day or the next day. Accordingly, based on this assumption, the GUI 200 may default to presenting item availability based on the buyer wanting to order now and have delivery within, e.g., 15 minutes. In some examples, if the buyer alternatively wishes to have the order delivered at a later time, the buyer may be presented with an option for specifying a later delivery time.

Based on the assumption that the buyer would like to order an item now, the buyer application may receive and present item information for the current time period, e.g., as if the buyer wants the order placed immediately. Thus, the user interface 200 may present the item information for based on the current inventory of couriers within a threshold delivery travel time of the indicated delivery location 204 of the buyer. For instance, as mentioned above, the order processing module may determine couriers within a threshold delivery travel time of the delivery location 204, determine the current inventories of those couriers, and may send item information to the buyer based on the current inventories. In some examples, the threshold delivery travel time may be based on the ability of a courier to arrive at the delivery location within a threshold time such as 15 minutes or less. The travel time may be determined based on the distance between the courier location and the delivery location and, in some cases, further based on the type of vehicle that the courier is using. Accordingly, in some cases, the threshold distance may change somewhat depending on current traffic conditions, an area of a city in which the delivery location is located, and so forth, but the threshold delivery travel time may be constant.

The GUI 200 may further include a price 230 for the first item and a price 232 for the second item. For instance, the buyer may tap on or otherwise select a first area 234 of the GUI 200 to select the first item, or the buyer may tap on or otherwise select a second area 236 of the GUI 200 to select the second item. Accordingly, the areas 234 and 236 may serve as virtual controls to enable the buyer to select one of the items for delivery. In some examples, a delivery fee may be included in the prices 230 and 232 of the items presented in the GUI 200, while in other examples, a separate delivery fee may be added to a total presented in subsequent user interface presented to the buyer following selection of one of the virtual controls 234 or 236.

Figure 3:
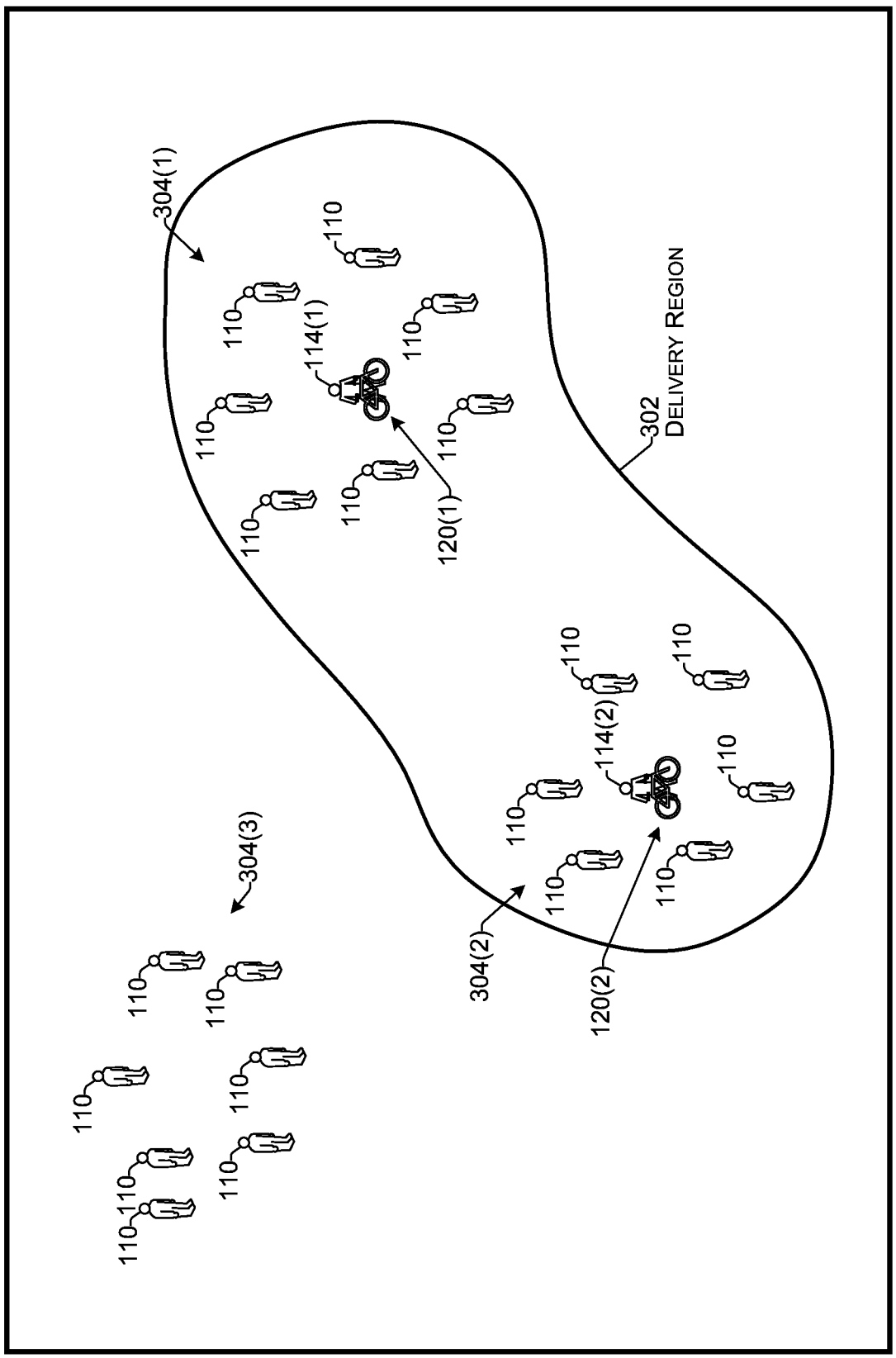
FIG. 3 illustrates an example delivery zone according to some implementations.

FIG. 3 illustrates an example 300 of determining delivery regions for fast delivery of items according to some implementations. In this example, a current delivery region 302, such as within a city may be based at least in part on a prediction of delivery locations of buyers 110 who are predicted to order items from a courier. For example, based on the past order information 152 discussed above with respect to FIG. 1, the delivery region 302 may be established to have a first configuration for weekdays, and a different second configuration for weekend days. For instance, the service provider may plan to have at least one courier 114(1) stationed at a first courier location 120(1) and at least one second courier 114(2) stationed at a second courier location 120(2).

As one example, the first courier location 120(1) may be selected based at least in part on a prediction that a first plurality of buyers 304(1) will place orders for an item from the first courier 114(1). Similarly, the second courier location 120(2) may be selected based at least in part on a prediction that a second plurality of buyers 304(2) will place orders for an item from the second courier 114(2). As mentioned above, the prediction on the number of orders that might be received in a particular area of the delivery region may change depending on the time of day and day of the week. For example, the number of orders received on a weekday may differ substantially from the number of orders received on a weekend day, such as based on whether the area of the delivery region is in a business district or residential district.

In addition, the delivery region 302 may be changed dynamically based on information received from buyer applications of buyers 110 that are located outside of the delivery region 302. For instance, suppose that a plurality of application open events are received from a third plurality of buyers 304(3) located in an area outside of the delivery region 302. In some cases, the courier module may use clustering techniques, such as based on the frequency and density of the application open events to determine a new area to add to the service region 302. For example, the courier module may determine distances between the locations of the buyers 110 when the application open events occurred and may assume that these locations would correspond to delivery locations if the buyers 110 were to place an order for delivery of an item. If the number of application open events received within a threshold time period are from a sufficient number of buyers 110 to meet a minimum threshold number of buyers, and are clustered in to an area sufficiently close to each other, the courier module may determine to expand the delivery region to encompass the area that includes the cluster of locations associated with the third plurality of buyers 304(3).

Figure 4:
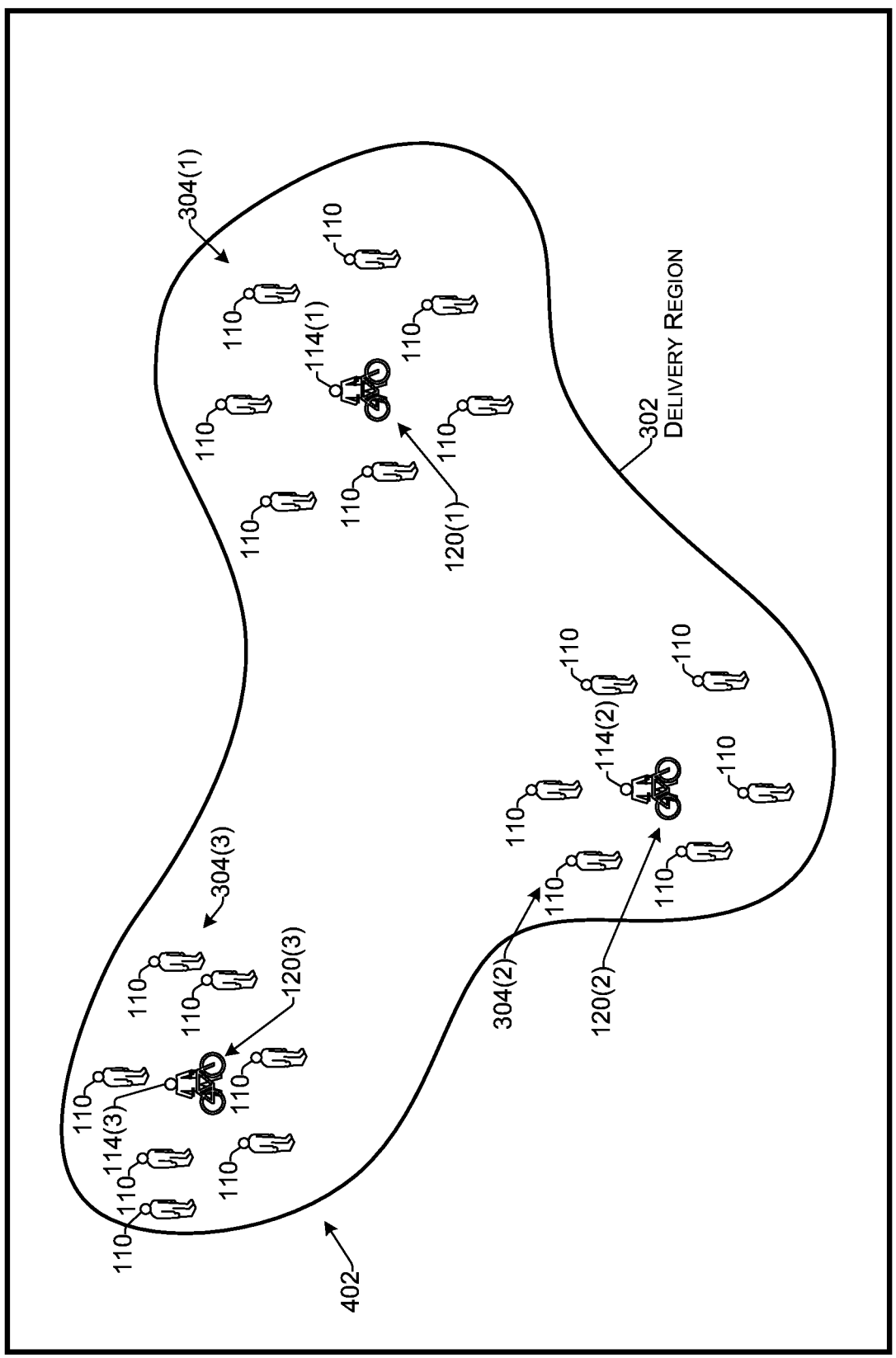
FIG. 4 illustrates an example of expanding the delivery zone according to some implementations.

FIG. 4 illustrates an example 400 of determining delivery regions for fast delivery of items according to some implementations. In this example, the delivery region 302 is expanded to include a new area 402 associated with the locations of the third plurality of buyers 304(3). Based on the locations determined from the application open events received from the third plurality of buyers 304(3), the courier module may recommend that a third courier 114(3) be stationed at a third courier location 120(3) that is within a threshold delivery travel time of at least some of the plurality of buyers 304(3). As mentioned above, in some examples, threshold delivery travel time may be selected such that the third courier 114(3) is able to arrive at the locations associated with the buyers 110 in the third plurality of buyers 304(3) within a threshold time, such as 15 minutes or less. Additionally, in some cases, the third plurality of buyers 304(3) may be determined using clustering techniques. For instance, a centroid may be determined for the cluster, and the third courier location 120(3) may be selected based at least in part on the cluster centroid. Further, as mentioned above, in some examples the expansion of the delivery region 302 may be for certain times of day, for certain days of the week, for certain types of items, or the like.

Figure 5:
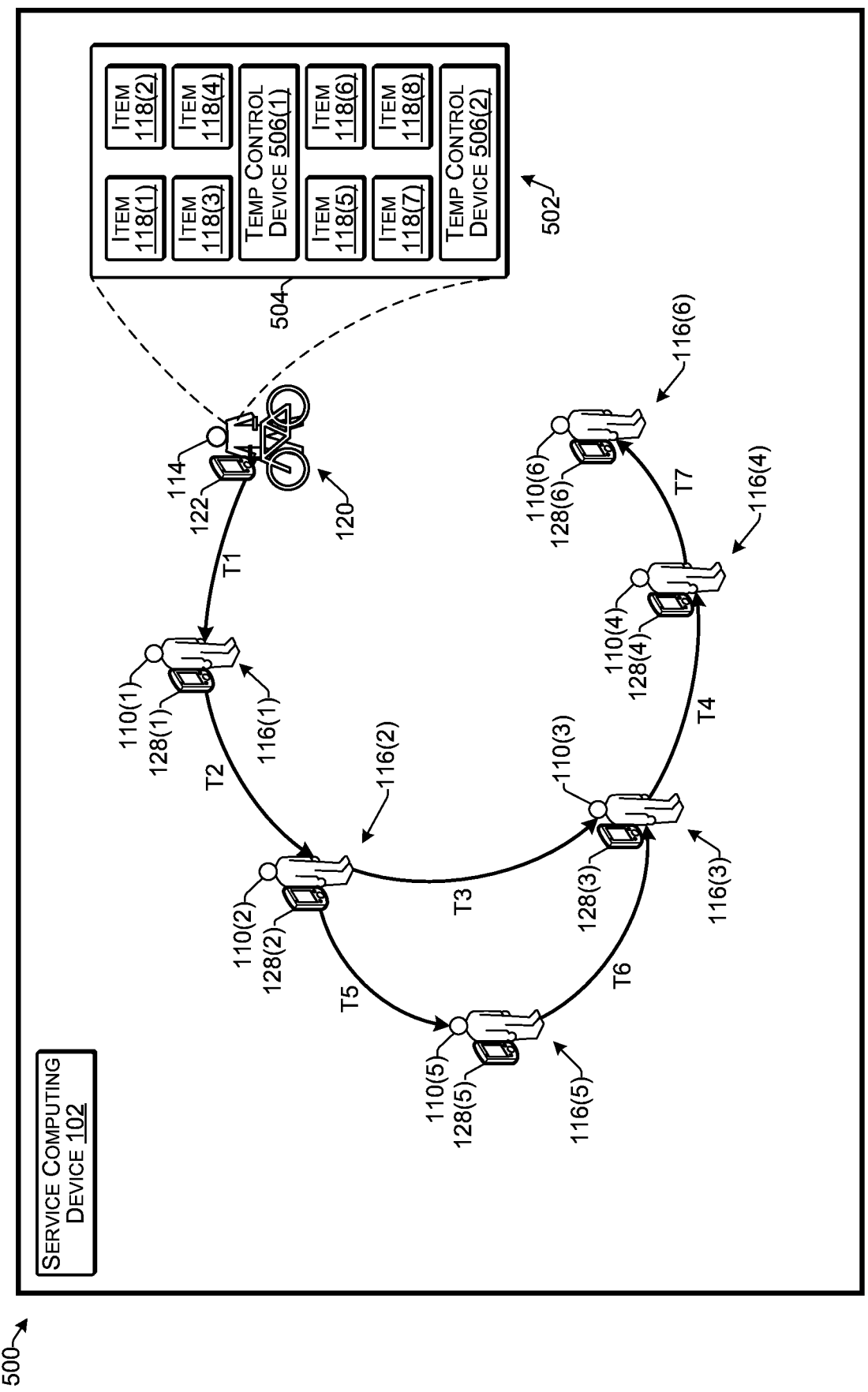
FIG. 5 illustrates an example of courier inventory and courier delivery assignments according to some implementations.

FIG. 5 illustrates an example 500 of determining a courier route for fast delivery of items according to some implementations. In this example, the courier 114 has eight of the same type of item 118(1)-118(10) remaining in inventory. The items 118 may be contained in an insulated backpack or other type of travel container 502 that includes an insulated outer wall 504 and one or more temperature control devices 506, such as temperature control devices 506(1) and 506(2). For instance, in the case that the items 118 are to be kept hot to avoid spoilage, the temperature control devices 506 may be heat packs. Alternatively, in the case that the items 118 are to be kept cool to avoid spoilage, the temperature control devices 506 may be cold packs.

In this example, suppose that the service computing device 102 receives, from a first buyer device 128(1) associated with a first buyer 110(1) and indication of a first delivery location 116(1). The service computing device may determine that a location 120 of the courier 114 is within a threshold delivery travel time of the first delivery location 116(1). For example, the service computing device may use map information, as discussed additionally below, to determine the distance from the courier location 120 to the first delivery location 116(1). Based on this distance, the service computing device 102 may determine that the estimated time travel time for the courier 114 from the current courier location to the first delivery location is a time T1. The service computing device may further determine that time T1 is less than the minimum threshold travel time. In some examples, the determination of the time T1 may be based on a large number of past deliveries made by couriers in the current delivery area, or in geographically similar to delivery areas. Further, in some cases the determination may be based in part on the type of vehicle that the courier 114 is using, whereas in other examples, the determination may be made without regard to the type of vehicle. For instance, when travel distances are short a motorized vehicle may have little advantages over a bicycle.

Based on the determination that the courier 114 with is within the threshold delivery time of the first delivery location 116(1), the service computing device 102 may send item information to the first buyer device 128(1), which may include information about the type of item in the couriers travel container 502. In this example, suppose that the first buyer 110(1) places an order for two of the items 118. In response, the service computing device 102 may send, to the courier device 122, first order information for a first order for two of the items 118 to be delivered to the first buyer 110(1) at the first delivery location 116(1). The courier 114 may use the courier device 122 to acknowledge receipt of the first order, and may begin traveling toward the first delivery location 116(1).

In the meanwhile, suppose that two additional buyers 110(2) and 110(3) have provided information regarding their respective delivery locations 116(2) and 116(3) via their respective buyer devices 128(2) and 128(3). The service computing device 102 may determine that the courier 114 is within the threshold delivery time of the second delivery location 116(2) and the third delivery location 116(3). Accordingly, the service computing device 102 may send item information to the second buyer device 128(2) in the third buyer device 128(3) based on the inventory in the courier's travel container 502. Suppose that the second buyer orders one item 118 and the third buyer orders three items 118. The service computing device 102 may determine that the travel time T2 (i.e., from the first delivery location 116(1) to the second delivery location 116(2)) plus the travel time T3 (i.e., from the second delivery location 116(2) to the third delivery location 116(3)) plus the remainder of the travel time from the courier's current location to the first delivery location 116(1) is less than the threshold travel time for delivery of the item to the third delivery location 116(3). Accordingly, the service computing device 102 may accept the orders from the second buyer and the third buyer, and may send order information for these orders to the courier device 122. Further, the service computing device 102 may note that the courier only has five available items 118 remaining in the inventory of the courier 114.

Furthermore, suppose that after the courier 114 delivers the first order to the first buyer 110(1), the service computing device 102 receives two more orders, e.g., a fourth order from a fourth buyer 110(4) for two items 118 to be delivered to a fourth delivery location 116(4), and a fifth order from a fifth buyer 110(5) for one item 118 to be delivered to a fifth delivery location 116(5). Furthermore, suppose that the time T5 from the second delivery location 116(2) to the fifth delivery location 116(5) plus the time T6 from the fifth delivery location 116(5) to the third delivery location 116(3) is not substantially greater than the time T3. Accordingly, the service computing device 102 may reroute the courier to the fifth delivery location 116(5) and then to the third delivery location 116(3), while still enabling the courier to deliver the items 118 to the third delivery location 116(3) under the threshold total travel time.

Additionally, prior to the fifth buyer 110(5) placing the fifth order, suppose that a sixth buyer 110(6) had opened the application on the buyer device 128(6), but had not yet placed an order. For example, the service computing device may have determined that a courier travel time to the sixth delivery location 116(6) is within the threshold travel time of the courier when taking into consideration, the travel times to which the courier is already committed. Subsequently, after the fifth buyer places the fifth order, the courier 114 no longer has any items available in inventory. Because all of the items in the courier's inventory have been ordered by other buyers, if the sixth buyer 110(6) attempts to place an order for one of the items, the sixth buyer 110(6) may be informed that the item is no longer available despite the travel time T7 being within the threshold delivery travel time. In some examples, the sixth buyer 110(6) may be able to request a notification when another courier is within a threshold travel time of the sixth delivery location 116(6). Alternatively, if the service computing device 102 has already assigned another courier to the area, the sixth buyer 110(6) may be able to order an item from the other courier's inventory.

Figure 6:
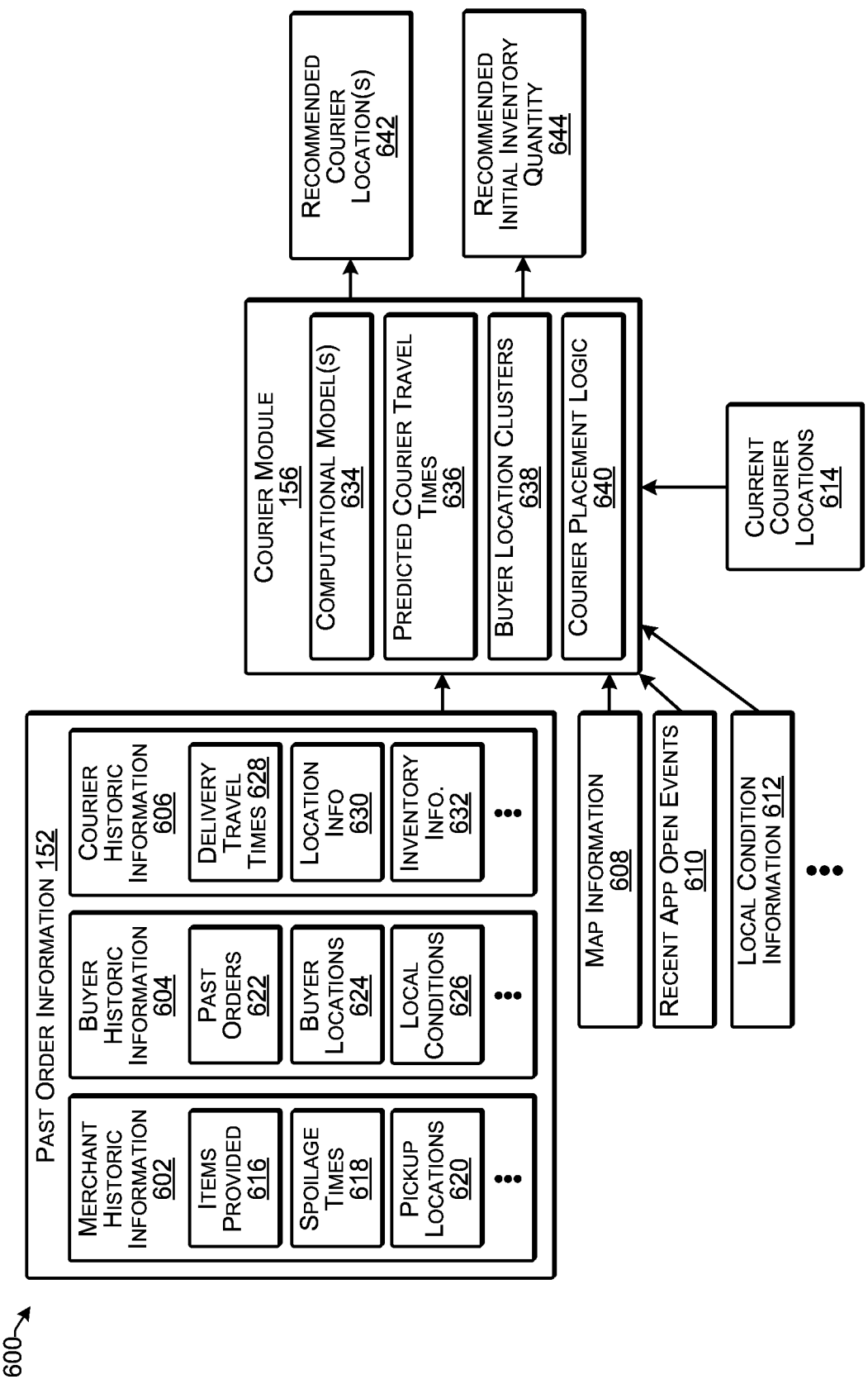
FIG. 6 is a block diagram illustrating an example of determining recommended courier locations according to some implementations.

FIG. 6 is a block diagram illustrating an example framework 600 for determining courier placement according to some implementations. In this example, the courier module 156 may receive the past order information 152 including merchant historic information 602, buyer historic information 604, and courier historic information 606. In addition, the courier module 156 may receive map information 608, recent application open events 610, local condition information 612, and/or current courier location information 614. Further, while several types of information that may be used by the courier module 156 are illustrated, in other examples, other or additional types of information may be used by the courier module 156, as discussed herein and/or as will be apparent to those of skill in the art having the benefit of the disclosure herein.

The merchant historic information 602 includes historic order information related to the merchants, e.g., various types of information related to the merchants that participate in the service of the service provider 104. For instance, the merchant historic information 602 may include items provided 616 by each merchant at particular times on particular days of the week, particular dates, and the like. Further, the merchant historic information 602 may include spoilage times 618 for the items provided by each merchant and the pickup locations 620 associated with each merchant. For example, if a threshold quantity of spoilage complaints are received for a particular item, the threshold spoilage time 618 for that item may be decreased. Alternatively, if spoilage complaints are not received for an item, the spoilage time 618 for that item may be gradually increased.

Additionally, the buyer historic information 604 includes historic order information related to the buyers. Examples of buyer historic information 604 may include past orders 622, e.g., a time of day, day of the week, and date on which each order was placed, item ordered, amount paid, and so forth. The buyer historic information 604 may further include buyer locations 624, including delivery locations to which each order was delivered, and locations of the buyer devices during application open events in which the application was opened, but an order was not placed because the buyer was outside a current delivery zone. Additionally, the buyer historic information 604 may include local conditions 626 that may have been in effect when the orders were received. For example, there may be more orders placed during certain weather conditions, such as during rain, during high heat, etc., or during certain local events, festivals, or the like.

Further, the courier historic information 606 includes historic order information related to the couriers. For example, the courier historic information 606 may include courier delivery travel times 628, which may indicate the time that an order was assigned and the time that the order was delivered, e.g., how long it took each courier to arrive at the delivery location and handoff the item after being assigned an order. Additionally, courier location information 630 may include locations of individual couriers at different times of day, for different days of the week, and in different parts of the service region. For instance, the courier location information 630 may indicate how long it took each courier to travel known distances, such as from the location at which the order was assigned to the delivery location. Thus, the courier module 156 may predict courier travel times based on a conversion factor determined from the courier location information. For example, the courier location information 630 may indicate that, on average, couriers on bicycles are able to travel about a mile in three minutes and about five miles in 15 minutes. Consequently, a threshold delivery travel time of 15 minutes, may correspond to a threshold distance that may be five miles or less for bicycle couriers.

In addition, the courier historic information 606 may include inventory information 632, such as how many items a particular courier picked up and how long it took the courier to unload the entire inventory of items. Furthermore, the merchant historic information 602, the buyer historic information 604, and the courier historic information 606 may include additional types of information, with the foregoing being merely several examples of the types of information that may be used by the courier module 156.

In some examples, the courier module 156 may employ one or more computational models 634 to determine predicted courier travel times 636 between locations, such as between a courier location and a buyer location or between two buyer locations 624. As one example, the predicted courier travel times 636 may be used for determining buyer location clusters 638. For instance, the courier module 156 may determine clusters 638 of buyer locations from which orders are likely to be received, and in which the buyer locations are clustered sufficiently close together so that a courier stationed at the cluster may fulfil orders within the threshold time. The courier module 156 may further employ courier placement logic 640 for determining recommended courier locations 642 at which couriers may be stationed to wait for orders to be received.

As one example, the buyer location clusters 638 may be determined based on past delivery locations. As another example, a new buyer location cluster 638 may be determined based on a plurality of application open events at respective locations in an area not currently within an established service region. Furthermore, in some examples, the buyer location clusters 642 may be determined based on different items 616 offered, different local conditions 612, different times of day, different days of the week, and the like. For example, on a particular day, if couriers will have burritos in their inventory, the buyer location clusters 638 may be calculated just based on buyer locations 624 corresponding to past orders 622 for burritos, rather than for all past orders. Consequently, the recommended courier locations 642 may change dynamically day to day depending on the particular item being offered by the couriers on the particular day.

In some examples, when determining buyer location clusters 638, a plurality of buyer locations 624 may be provided to the one or more computational models 634, such as in the form of longitude and latitude GPS coordinates. The computational model 634 may determine clusters of the buyer locations, such as based on any suitable clustering algorithm, e.g., density-based clustering, centroid-based clustering, or the like. As one example, a clustering algorithm, such as the k-means algorithm, may be used to determine clusters of delivery locations or application open event locations based at least in part on determining distances between the respective delivery locations or the respective application open locations. The determined distances may be converted to predicted courier travel times 636, e.g., based on the conversion factor discussed above, e.g., for bicycle couriers a mile may be converted to 3 minutes, or other number, based on average travel times determined from the delivery travel times 628 and/or the courier location information 630. Furthermore, in some cases, the predicted delivery travel times 636 may include an average handoff time that is added in, e.g., an amount of time after the courier arrive at the delivery location for the courier to knock on the door and hand the item to the buyer.

As one example, when identifying buyer locations to include in a cluster 638, the maximum predicted courier travel time 636 between any two locations included in the cluster 638 may be less than twice the threshold delivery travel time. Thus, a courier may be stationed close to the center of cluster 638 and may be able to reach any predicted delivery location in the cluster 638 within the threshold delivery travel time. Additionally, in some examples, traffic information or other local condition information 612, such as may be obtained from an online map service, e.g., via a webserver or other network source, may also be taken into consideration in combination with the output of the computational model when determining the predicted courier travel times 636. Further, the courier module 156 may adjust the technique for determining the predicted courier travel times 636 based on received courier location information 630. For example, if the actual courier travel time is different from that predicted by the computational model 634, the courier module 156 may adjust the conversion factor or other logic used to determine the predicted courier travel times 636 so that the predicted times are more accurate.

As mentioned above, the courier location information sent from the courier devices to the service computing device may be used to determine the current courier locations 614. In some examples, the courier application may automatically send courier location information to the courier module on a periodic basis while the associated courier is on-duty or otherwise active. Alternatively, the courier module 156 may periodically ping the courier devices of active couriers to determine the couriers' current locations. Each courier device may include one or more location sensors, such as a GPS receiver, and/or communication interfaces that can determine (e.g., from cell towers or wireless access points) a geographic location of the courier device. Thus, the courier module 156 may continually receive courier location information from the courier device, such as every 10 seconds, every 30 seconds, every minute, every 2 minutes etc., and may continually update the courier location with respect to map information 608.

Additionally, or alternatively, the courier application may send location information whenever acceleration of the courier device exceeds a threshold level, or the like, which may indicate starting, stopping, or other movement by the courier. Accordingly, the courier module 156 may continuously track the courier's location, such as for determining initial movement toward the delivery location following assignment of a delivery job, arrival at the delivery location, and departure from the delivery location. Based on this location information provided by the courier devices, the courier module 156 may determine courier travel times for comparison with the predicted courier travel times 636.

The courier placement logic 640 may include one or more algorithms, one or more computational models, a plurality of decision-making rules, or the like, configured to determine, based on the buyer location clusters, locations at which to station couriers, how many couriers to station at each location, how many items to recommend that each courier include in his or her initial inventory, and so forth. For instance, the courier placement logic 640 may employ the various different considerations discussed above to determine the recommended courier locations 642 based on the clusters, the number of potential orders predicted for each cluster, the density of each cluster, and so forth. As one example, the courier placement logic may determine a centroid of a buyer location cluster 638, and may recommend that a courier be stationed at or near the centroid (e.g., within a several minutes travel time). In addition, based on how quickly couriers have delivered their entire inventories in the past when stationed at various different locations, and based on the item spoilage times 618 for particular items, the courier placement logic 640 may recommend an initial inventory quantity 644 of items for the couriers to pick up for their inventories.

Further, as mentioned above, the courier placement logic 640 may dynamically establish a new delivery region based on identifying a cluster of application open events that took place at buyer locations outside an established delivery region, and that exceeded a threshold number of events detected over a threshold period of time. Thus, based at least in part on location information received a plurality of buyer devices, e.g., as determined by the GPS receivers of the respective buyer devices, the service herein is able to identify new areas to which to expand the service, even though the service may not have previously made any deliveries or other sales of the items in the new delivery region.

Figure 7:
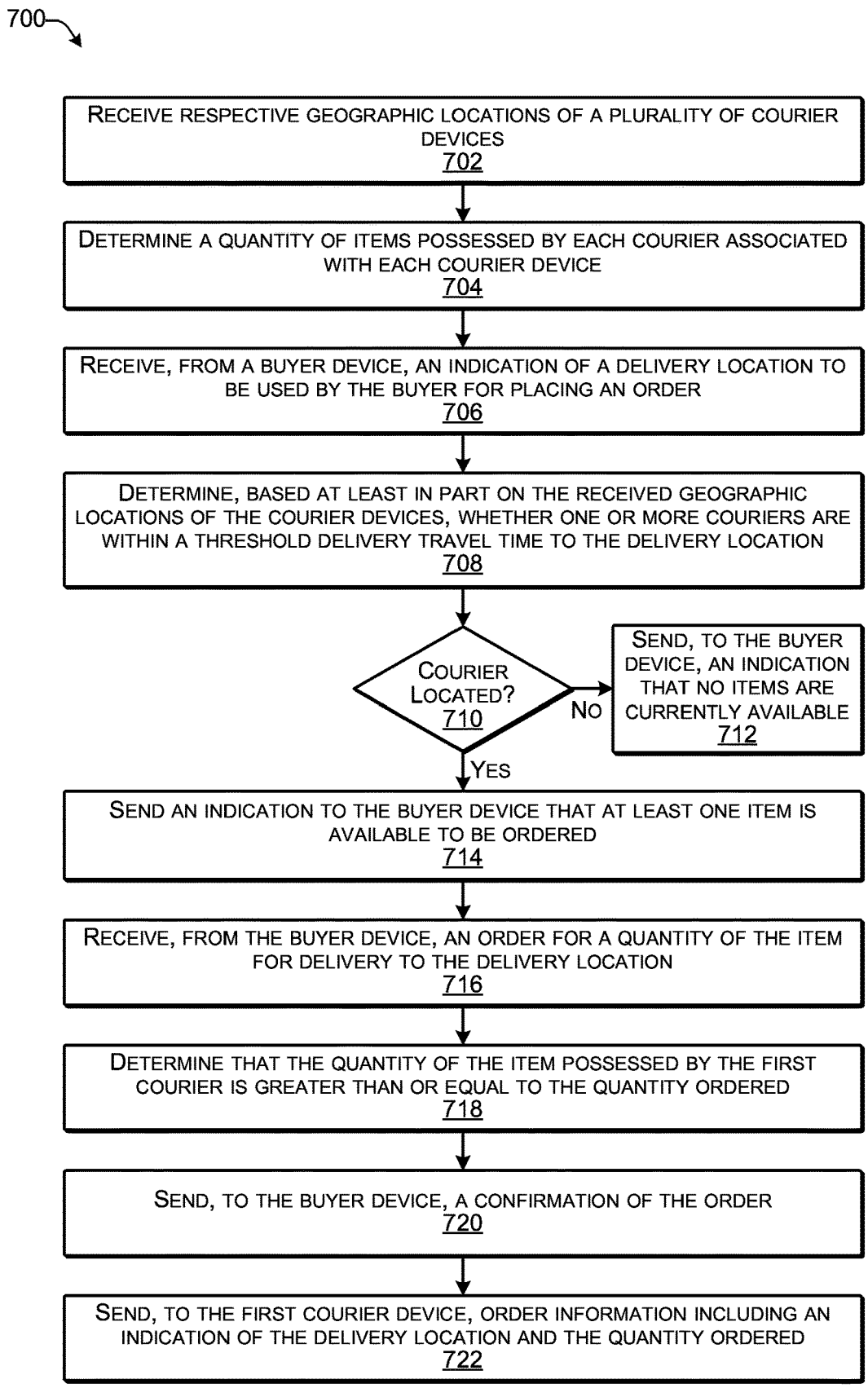
FIG. 7 is a flow diagram illustrating an example process for determining courier placement for fast delivery according to some implementations.
Figure 8:
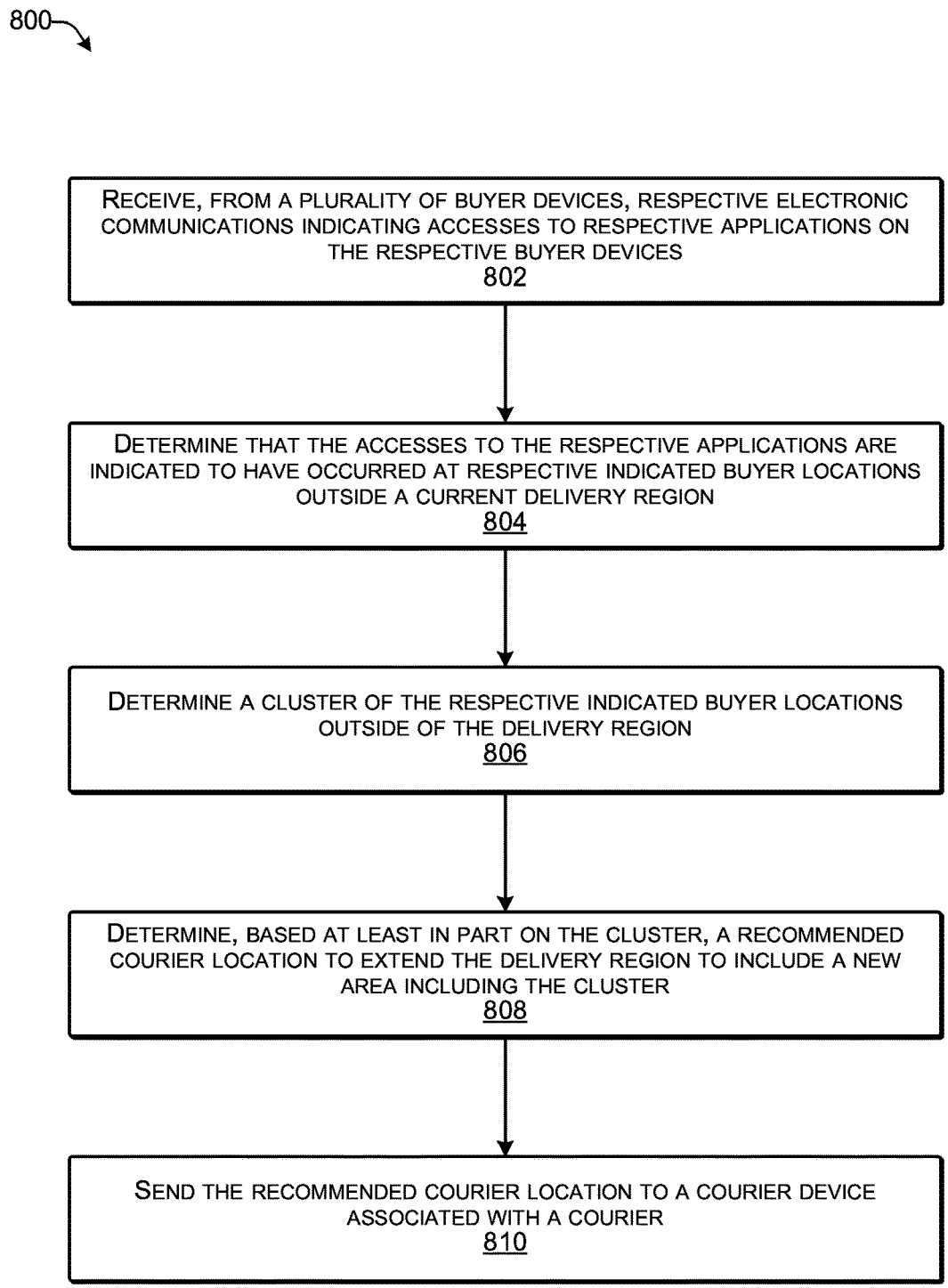
FIG. 8 is a flow diagram illustrating an example process for determining courier placement for a new service area according to some implementations.

FIGS. 7 and 8 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 7 is a flow diagram illustrating an example process 700 for determining a courier for fast deliveries to a buyer according to some implementations. In some examples, the process may be executed in part by the service computing device 102 or by another suitable computing device, and in part by the courier devices 122 and the buyer devices 128.

At 702, the computing device may receive respective geographic locations of a plurality of courier devices. For example, a plurality of courier devices associated with a plurality of couriers may send respective electronic communications indicating respective locations of the courier devices based at least in part on respective geographic locations of the courier devices determined through information from respective courier device GPS receivers.

At 704, the computing device may determine a quantity of items possessed by each courier associated with each courier device. For example, the computing device may keep a record of the inventory of each courier. Additionally or alternatively, the courier application on each courier device may periodically send information regarding the inventory of each courier to the service computing device.

At 706, the computing device may receive, from a buyer device, an indication of a delivery location to be used by the buyer for placing an order. For instance, as mentioned above, the delivery location may be based on GPS information determined by the buyer device, or the delivery location may be entered manually by the buyer.

At 708, the computing device may determine, based at least in part on the received geographic locations of the courier devices, one or more couriers within a threshold delivery travel time to the delivery location. For instance, the computing device may determine predicted courier travel times based on the location of each of the couriers to the delivery location indicated by the buyer. As one example, the predicted courier travel times may be determined based on the distance between the couriers' current locations and the indicated delivery location, and a conversion factor may be used for determining the predicted courier travel times.

At 710, the computing device may determine whether any couriers have been located that are within the threshold delivery travel time to the delivery location.

At 712, if no couriers are located, the computing device may send, to the buyer device, an indication that no items are currently available. Accordingly, the application on the buyer device may present a notification that there are no items currently available for delivery to the buyer at the indicated delivery location.

At 714, on the other hand, if at least one courier is located, the computing device may send an indication to the buyer device that at least one item is available to be ordered. For example, the computing device may send item information to the buyer device corresponding to the inventory of the at least one courier that is within the threshold travel distance to the delivery location indicated by the buyer.

At 716, the computing device may receive, from the buyer device, an order for a quantity of the item for delivery to the delivery location.

At 718, the computing device may determine that the quantity of the item possessed in the inventory of the first courier is greater than or equal to the quantity ordered.

At 720, the computing device may send to the buyer device, a confirmation of the order.

At 722, the computing device may send to the first courier device, order information including an indication of the delivery location and the quantity of the item ordered. Upon receipt of the order information, the courier may proceed to the delivery location and deliver the indicated quantity of the item to the buyer at the delivery address.

FIG. 8 is a flow diagram illustrating an example process 800 for determining a new area to which to extend a delivery region according to some implementations. In some examples, the process may be executed in part by the service computing device 102, and in part by the buyer devices 128.

At 802, the computing device may receive, from a plurality of buyer devices, respective electronic communications indicating accesses to respective applications on the respective buyer devices. For example, when buyers open the buyer application in an area that is outside of a delivery region, to attempt to order an item, the buyer application may indicate that no items currently available for delivery to the indicated delivery location. However, the service computing device may keep a record of the locations of the buyers when the buyer applications were accessed for attempting to place an order outside of the delivery region.

At 804, the computing device may determine that the accesses to the respective applications are indicated to have occurred at respective indicated buyer locations outside a current delivery region.

At 806, the computing device may determine a cluster of the respective indicated buyer locations outside of the delivery region. For example, the computing device may use any suitable clustering technique for identifying a cluster of buyer locations that are sufficiently close enough to one another to be within a threshold travel time of one another.

At 808, the computing device may determine, based at least in part on the cluster, a recommended courier location to extend the delivery region to include a new area including the cluster. As one example, the computing device may station a courier proximate to the cluster to begin delivery to a new area corresponding to the identified cluster of buyer locations. In some cases, the computing device may determine a centroid of the cluster and may determine a recommended location for the courier based at least in part on the centroid of the cluster.

At 810, the computing device may send the recommended courier location to a courier device associated with a courier. In some examples, the process 800 may be executed before the process 700 discussed above with respect to FIG. 7. In other examples of course, the process 800 may be executed concurrently with the process 700 or after the process 700.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 9:
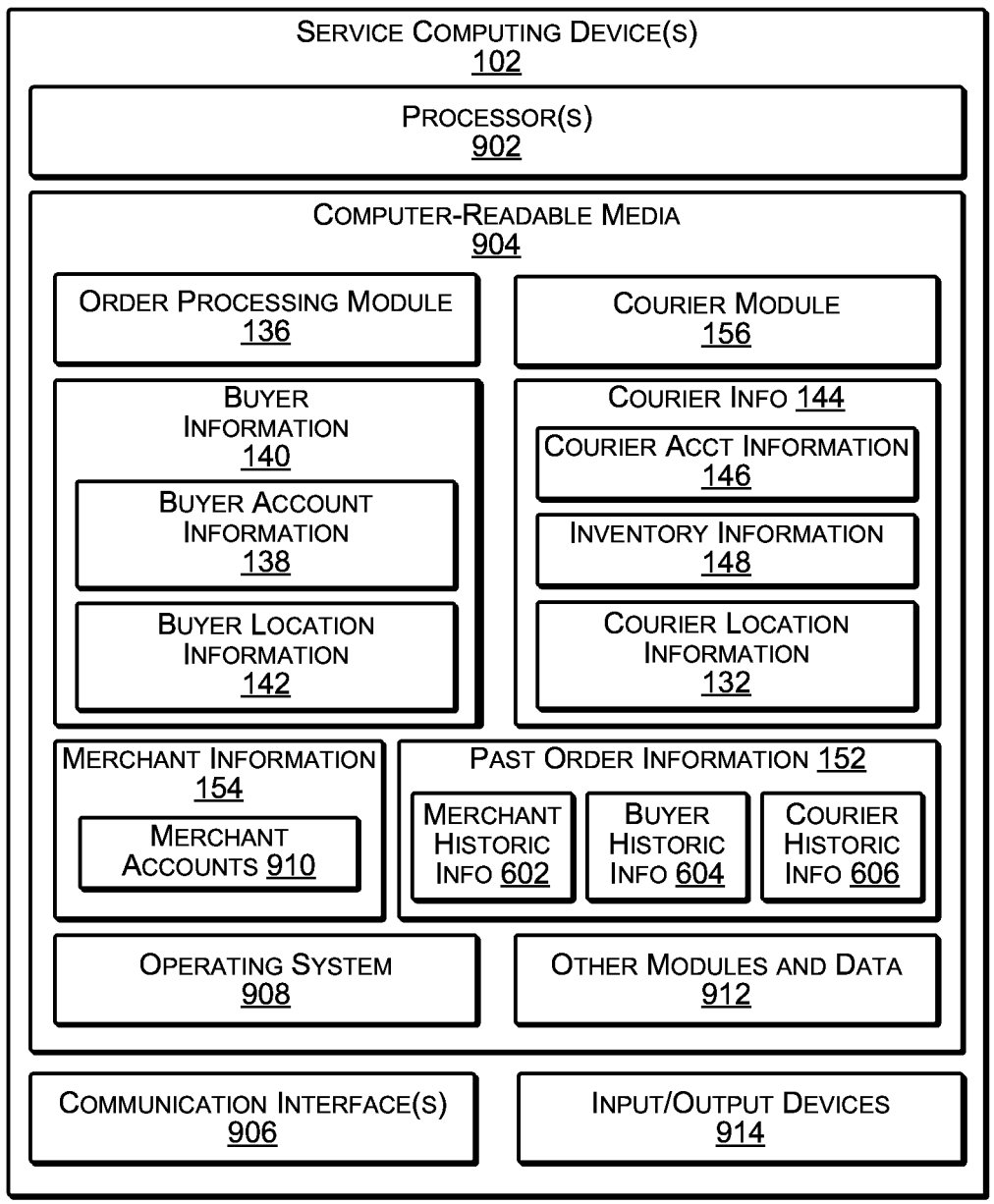
FIG. 9 illustrates select components of one or more example service computing devices according to some implementations.

FIG. 9 illustrates select components of the service computing device 102 that may be used to implement some functionality of the services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 902, one or more computer-readable media 904, and one or more communication interfaces 906. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 904 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 904 may be used to store any number of functional components that are executable by the processors 902. In many implementations, these functional components comprise instructions or programs that are executable by the processors 902 and that, when executed, specifically configure the one or more processors 902 to perform the actions attributed above to the service computing device 102. Functional components stored in the computer-readable media 904 may include the order processing module 136 and the courier module 156. Additional functional components stored in the computer-readable media 904 may include an operating system 908 for controlling and managing various functions of the service computing device 102.

In addition, the computer-readable media 904 may store data used for performing the operations described herein. Thus, the computer-readable media 904 may store: the buyer information 140, including buyer account information 138 and buyer location information 142; the courier information 144, including courier account information 146, inventory information 148, and courier location information 132; the merchant information 154, including merchant accounts 910; and the past order information 152, including the merchant historic information 602, the buyer historic information 604, and the courier historic information 606. The service computing device 102 may also include or maintain other functional components and data not specifically shown in FIG. 9, such as other modules and data 912, which may include programs, drivers, etc., and the data used or generated by the functional components. Further, the service computing device 102 may include many other logical, programmatic and physical components, of which those described above are merely examples that are related to the discussion herein.

The communication interface(s) 906 may include one or more interfaces and hardware components for enabling communication with various other devices, such as over the network(s) 106. For example, communication interface(s) 906 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 914. Such I/O devices 914 may include a display, various user interface controls (e.g., buttons, joystick, keyboard, mouse, touch screen, etc.), audio speakers, connection ports and so forth.

Figure 10:
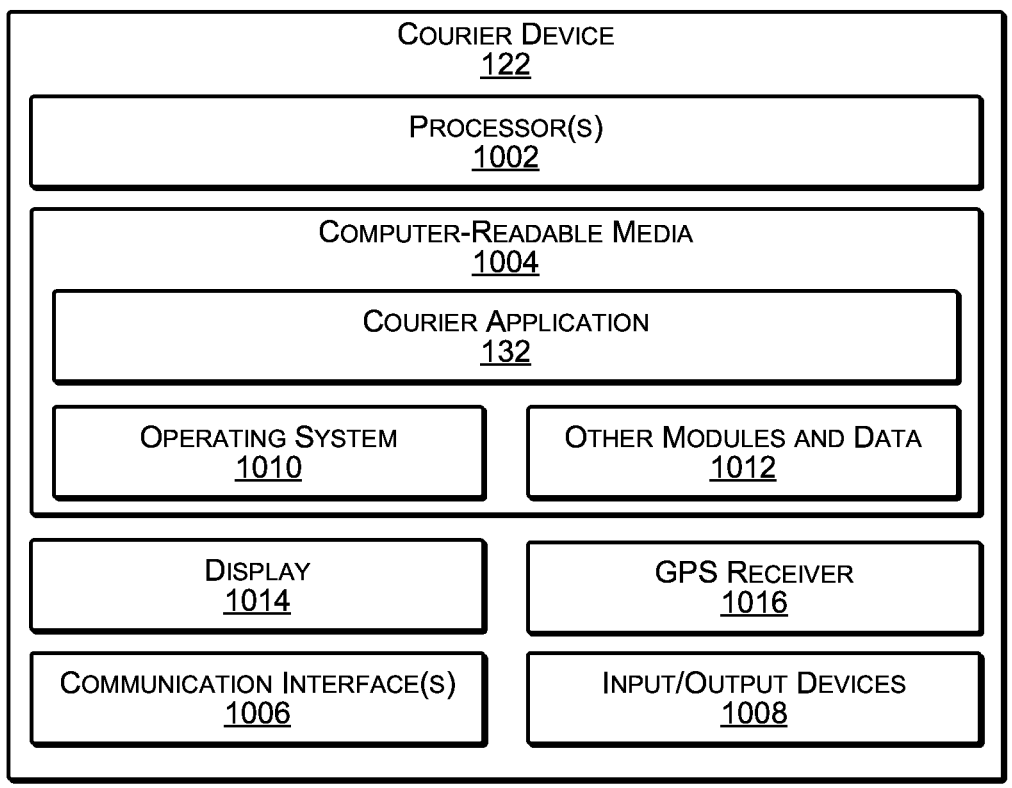
FIG. 10 illustrates select components of an example courier device according to some implementations.

FIG. 10 illustrates select example components of the courier device 122 that may implement the functionality described above according to some examples. The courier device 122 may be any of a number of different types of portable computing devices. Some examples of the courier device 122 may include smart phones and mobile communication devices; tablet computing devices; laptops, netbooks and other portable computers; wearable computing devices and/or body-mounted computing devices, which may include watches; augmented reality devices, such as helmets, goggles or glasses; and any other portable device capable of sending communications and performing the functions according to the techniques described herein.

In the example of FIG. 10, the courier device 122 includes components such as at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the courier device 122, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1004 may include, but is not limited to, RAM, ROM, EEPROM, flash memory, solid-state storage, magnetic disk storage, optical storage, and/or other computer-readable media technology. Further, in some cases, the courier device 122 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules, or components that may be executed by the processor 1002. Further, when mentioned herein, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the courier device 122. Functional components of the courier device 122 stored in the computer-readable media 1004 may include the courier application 132, as discussed above, which may present the courier with one or more GUIs for performing the courier tasks. Additional functional components may include an operating system 1010 for controlling and managing various functions of the courier device 122 and for enabling basic user interactions with the courier device 122.

In addition, the computer-readable media 1004 may also store data, data structures and the like, that are used by the functional components. Depending on the type of the courier device 122, the computer-readable media 1004 may also optionally include other functional components and data, such as other modules and data 1012, which may include applications, programs, drivers, etc., and the data used or generated by the functional components. Further, the courier device 122 may include many other logical, programmatic, and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 10 further illustrates that the courier device 122 may include a display 1014, which may be any suitable type of electronic display device for visually presenting information, GUIs, or the like. Alternatively, in some examples, the courier device 122 may not include a display.

The courier device 122 may further include the one or more I/O devices 1008. The I/O devices 1008 may include speakers, a microphone, a camera, and various user controls (e.g., buttons, a joystick, a keyboard, a keypad, etc.), a haptic output device, and so forth. Other components included in the courier device 122 may include various types of sensors, which may include a GPS receiver 1016 able to receive and indicate location information, as well as other sensors (not shown) such as an accelerometer, gyroscope, compass, proximity sensor, and the like. In some cases, the GPS receiver 1016 may be used by the courier application 132 to determine a current geographic location of the courier device 122. Additionally, or alternatively, the communication interfaces 1006 may be used to determine the current location of the courier device 122, such as based on communication with nearby cell towers, wireless access points, and the like. In some examples, the courier application 132 may send this location information periodically to the service computing device as an indicated location of the associated courier. Additionally, or alternatively, the courier application 132 may send the location information whenever the accelerometer indicates a change in acceleration, e.g., beyond threshold amount, which may indicated starting movement or stopping movement by the courier. Furthermore, the courier device 122 may include various other components that are not shown, examples of which include removable storage, a power source, such as a battery and power control unit, and so forth.

Figure 11:
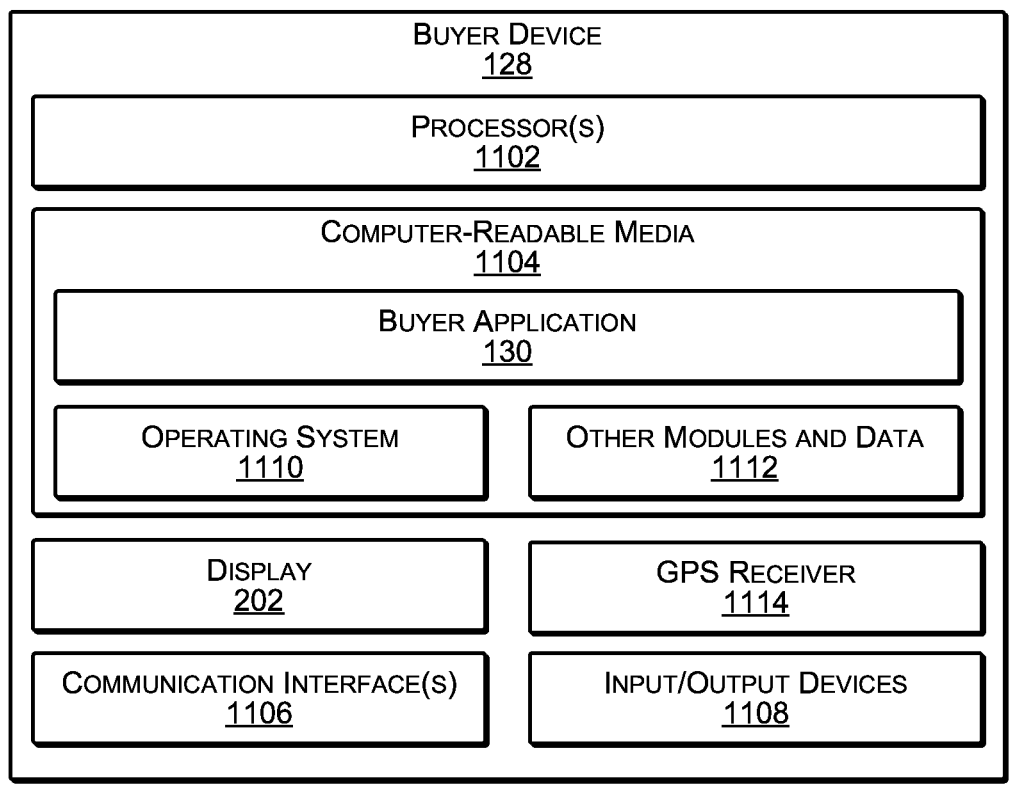
FIG. 11 illustrates select components of an example buyer device according to some implementations.

FIG. 11 illustrates select example components of the buyer device 128 that may implement the functionality described above according to some examples. The buyer device 128 may be any of a number of different types of portable computing devices or semi-portable computing devices. Some examples of the buyer device 128 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 128 may be a stationary or semi-stationary computing device, such as a desktop computer or other device with computing capabilities.

In the example of FIG. 11, the buyer device 128 includes components such as at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the buyer device 128, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1104 may include, but is not limited to, RAM, ROM, EEPROM, flash memory, solid-state storage, magnetic disk storage, optical storage, and/or other computer-readable media technology. Further, in some cases, the buyer device 128 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the buyer device 128. Functional components of the buyer device 128 stored in the computer-readable media 1104 may include the buyer application 130, as discussed above, which may present the buyer with one or more GUIs for placing an order, some examples of which are described above. Additional functional components may include an operating system 1110 for controlling and managing various functions of the buyer device 128 and for enabling basic user interactions with the buyer device 128.

In addition, the computer-readable media 1104 may also store data, data structures and the like, that are used by the functional components. Depending on the type of the buyer device 128, the computer-readable media 1104 may also optionally include other functional components and data, such as other modules and data 1112, which may include applications, programs, drivers, etc., and the data used or generated by the functional components. Further, the buyer device 128 may include many other logical, programmatic and physical components, of which those described are merely examples that are related to the discussion herein.

The communication interface(s) 1106 may include one or more interfaces and hardware components for enabling communication with various other devices, such as over the network(s) 106 or directly. For example, communication interface(s) 1106 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 11 further illustrates that the buyer device 128 may include the display 202. Depending on the type of computing device used as the buyer device 128, the display 202 may employ any suitable display technology. Alternatively, in some examples, the buyer device 128 may not include a display.

The buyer device 128 may further include the one or more I/O devices 1108. The I/O devices 1108 may include speakers, a microphone, a camera, and various user controls (e.g., buttons, a joystick, a keyboard, a keypad, etc.), a haptic output device, and so forth. Other components included in the buyer device 128 may include various types of sensors, which may include a GPS receiver 1114 able to indicate location information, as well as other sensors (not shown) such as an accelerometer, gyroscope, compass, proximity sensor, and the like. In some cases, the GPS receiver 1114 may be used by the buyer application 130 to determine a current geographic location of the buyer device 128. Additionally, or alternatively, the communication interfaces 1106 may be used to determine the current location of the buyer device 128, such as based on communication with nearby cell towers, wireless access points, and the like. In some examples, the buyer application 130 may send this location information to the service computing device as an indicated delivery location for the associated buyer. Additionally, the buyer device 128 may include various other components that are not shown, examples of which include removable storage, a power source, such as a battery and power control unit, and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system for enabling a courier delivery within a threshold time, the system comprising a service computing device including a service computing device processor and a service computing device communication interface coupled to the service computing device processor for communicating over one or more networks with a plurality of buyer devices and a plurality of courier devices, the service computing device programmed to:

receive, from a subset of the plurality of buyer devices, respective communications indicating occurrence of multiple application open events of respective buyer applications executing on multiple buyer devices of the plurality of buyer devices at respective geographic locations outside a delivery region, wherein each buyer application of the respective buyer applications configures each buyer device of the multiple buyer devices to send location information indicating the respective geographic location of the buyer device in response to the buyer application being opened on the buyer device;

determine a cluster of the respective geographic locations of the application open events outside of the delivery region and within a threshold distance of each other;

determine, based at least in part on the cluster of the respective geographic locations of the application open events, an additional delivery region, the additional delivery region including the cluster of the respective geographic locations of the application open events that are within the threshold distance of each other;

receive, from the plurality of courier devices, respective geographic locations of the plurality of courier devices;

determine a quantity of items already picked up from a merchant pickup location and possessed by respective couriers of a plurality of couriers associated with the plurality of courier devices; and based on determining that a first courier device of the plurality of courier devices is within a threshold delivery travel time to the cluster, and based on determining the quantity of items already picked up and possessed by a first courier associated with the first courier device is at least one, send item information to the buyer devices corresponding to the cluster to cause the respective buyer applications executing on the buyer devices corresponding to the cluster to present, in respective user interfaces, information about the at least one item possessed by the first courier and an indication that the at least one item is available to be ordered.

2. The system as recited in claim 1, wherein the service computing device is further programmed to:
   determine a centroid of the cluster of the respective geographic locations of the application open events outside of the delivery region that are within the threshold distance of each other; and
   send, to the first courier device, an indication for the first courier to travel to a location proximate to the cluster based on the centroid of the cluster to extend the delivery region to include a new area including at least a portion of the cluster.

3. The system as recited in claim 1, wherein the service computing device is further programmed to determine the cluster based at least in part on determining that predicted courier travel times between the respective geographic locations of the application open events outside of the delivery region included in the cluster are less than a selected time.

4. The system as recited in claim 1, wherein the service computing device is further programmed to:
   receive, from a first buyer device of the buyer devices corresponding to the cluster, an indication of a delivery location for placing a first order for a first quantity of the at least one item;
   determine that the quantity of the at least one item possessed by the first courier is greater than or equal to the first quantity;
   send, to the first buyer device, a confirmation of the first order; and
   send, to the first courier device, first order information including an indication of the delivery location and the first quantity.

5. A method comprising:
   receiving, by a computing device, from buyer applications executing on a plurality of respective buyer devices, electronic communications indicating application open events on the respective buyer devices, wherein each buyer application executing on each respective buyer device of the plurality of respective buyer devices configures the respective buyer device to send a respective electronic communication including location information indicating a respective geographic location of the respective buyer device in response to the application open event;
   determining, by the computing device, a plurality of the respective geographic locations of the application open events on the respective buyer devices from the location information in the received electronic communications;
   determining, by the computing device, based on the plurality of respective geographic locations that the plurality of application open events occurred on the respective buyer devices located outside a delivery region of a plurality of couriers;
   determining, by the computing device, a set of multiple ones of the application open events having the respective geographic locations outside of the delivery region that are within a threshold distance of each other;
   determining, by the computing device, based at least in part on the respective geographic locations of the set of the application open events, an additional delivery region for at least one courier of the plurality of couriers, the additional delivery region including the respective geographic locations of the set of the application open events at which the application open events occurred on the respective buyer devices and that are within the threshold distance of each other; and
   sending, by the computing device, to a courier device associated with a first courier, courier location information based on the additional delivery region.

6. The method as recited in claim 5, further comprising:
   determining, from the set, a cluster of the respective geographic locations of the application open events outside of the delivery region by determining that a distance between members of the cluster is less than the threshold distance.

7. The method as recited in claim 6, further comprising:
   determining a centroid of the cluster; and
   determining the courier location information based at least in part on the centroid of the cluster.

8. The method as recited in claim 5, wherein the set includes a first cluster, the method further comprising:
   determining a second cluster of past delivery locations for a plurality of past orders; and
   determining courier location information for a second courier based at least in part on the second cluster.

9. The method as recited in claim 8, further comprising:
   determining the second cluster based on a plurality of the past delivery locations associated with a particular item of a plurality of different items delivered in the past;
   determining the courier location information for the second courier based at least in part on the second cluster determined for based on the plurality of past delivery locations associated with the particular item of the plurality of different items; and
   sending the courier location information for the second courier to a courier device associated with the second courier based at least in part on the second courier having the particular item in an inventory of the second courier.

10. The method as recited in claim 5, further comprising:
receiving, from the courier device associated with the first courier, an indicated location of the courier device based at least in part on a geographic location of the courier device determined through information from a courier device GPS receiver;
determining a quantity of items possessed by the first courier associated with the courier device;
receiving, from a first buyer device, an indication of a first delivery location for placing a first order for at least one of the items;
determining, based at least in part on the received indicated location of the courier device, that the courier device is within a threshold delivery travel time to the first delivery location;
based on determining the courier device is within the threshold delivery travel time to the first delivery location and based on determining the quantity of items possessed by the first courier is at least one, sending item information to the first buyer device to cause a buyer application on the first buyer device to present, in a user interface, information about the at least one item possessed by the first courier and an indication that the at least one item is available to be ordered;
receiving, from the first buyer device, a first order for a first quantity of the at least one item for delivery to the first delivery location;
determining that the quantity of the at least one item possessed by the courier is greater than or equal to the first quantity;
sending, to the first buyer device, a confirmation of the first order; and
sending, to the courier device, first order information including an indication of the first delivery location and the first quantity.

11. The method as recited in claim 10, further comprising:
receiving, from a second buyer device, an indication of a second delivery location for placing a second order for a second quantity of the at least one item;
determining that the second delivery location is within the threshold delivery travel time to the first delivery location and that the quantity of the at least one item possessed by the courier is greater than the first quantity;
sending item information to the second buyer device to cause a buyer application on the second buyer device to present, in a user interface, information about the at least one item items possessed by the first courier and an indication that the at least one item is available to be ordered;
receiving, from the second buyer device, a second order for a second quantity of the at least one item for delivery to the second delivery location;
determining that the quantity of the at least one item possessed by the courier is greater than or equal to the first quantity plus the second quantity;
sending, to the second buyer device, a confirmation of the second order; and
sending, to the courier device, second order information including an indication of the second delivery location and the second quantity.

12. The method as recited in claim 5, further comprising:
receiving, from a plurality of courier devices associated with a plurality of couriers, respectively, including the first courier, respective electronic communications indicating respective locations of the courier devices based at least in part on respective geographic locations of the courier devices determined through information from respective courier device GPS receivers;
determining past courier travel times from respective courier locations to respective delivery locations for a plurality of orders based on the receiving of the respective electronic communications; and
predicting a courier travel time for a new order based at least in part on the past courier travel times.

13. The method as recited in claim 5, further comprising:
receiving, from a plurality of courier devices associated with a plurality of couriers, respectively, including the first courier, respective electronic communications indicating respective locations of the courier devices based at least in part on respective geographic locations of the courier devices determined through information from respective courier device GPS receivers;
receiving, from one of the buyer devices of the plurality of respective buyer devices, an indication of a delivery location;
determining, for each of the plurality of courier devices, that a predicted delivery travel time to the indicated delivery location is greater than a threshold delivery travel time; and
sending an indication to the buyer device that the item is unavailable to be ordered.

14. One or more non-transitory computer-readable media maintaining instructions that, when executed by one or more processors, program the one or more processors to:
receive, by the one or more processors, from buyer applications executing on a plurality of respective buyer devices, respective electronic communications indicating application open events on the respective buyer devices, wherein the each buyer application executing on each respective buyer device of the plurality of respective buyer devices configures the respective buyer device to send a respective electronic communication including location information indicating a respective geographic location of the respective buyer device corresponding in response to the application open event;
determine, based on the received location information, that a plurality of the application open events for the buyer applications are indicated to have occurred at geographic locations outside a delivery region of a plurality of couriers;
determine a plurality of the geographic locations of the plurality of application open events that are outside of the delivery region and that are within a threshold distance of each other;
determine, based at least in part on the plurality of geographic locations, an additional delivery region including at least a portion of the plurality of geographic locations of the plurality of application open events that are within the threshold distance of each other; and
send first courier location information to a first courier device based on the additional delivery region.

15. The one or more non-transitory computer-readable media as recited in claim 14, wherein the instructions further program the one or more processors to:
determine a cluster from the plurality of geographic locations of the plurality of application open events occurring outside of the delivery region;
determine a centroid of the cluster; and
determine the first courier location information based at least in part on the centroid of the cluster.

16. The one or more non-transitory computer-readable media as recited in claim 14, wherein the instructions further program the one or more processors to:
  determine a plurality of past delivery locations associated with past orders;
  determine, based at least in part on the past delivery locations, second courier location information; and
  send to a second courier device, the second courier location information.

17. The one or more non-transitory computer-readable media as recited in claim 16, wherein the instructions further program the one or more processors to determine the second courier location information by:
  determining a cluster of the past delivery locations; and
  determining the second courier location based at least in part on the cluster of the past delivery locations.

18. The one or more non-transitory computer-readable media as recited in claim 17, wherein the instructions further program the one or more processors to:
  determine the cluster of past deliver locations based on a plurality of the past delivery locations associated with a particular item of a plurality of different items delivered in the past;
  determine the second courier location information based at least in part on the cluster determined for the plurality of past delivery locations associated with the particular item; and
  send the second courier location information to the second courier device based at least in part on determining that a courier associated with the second courier device has the particular item in an inventory of the courier.

19. The one or more non-transitory computer-readable media as recited in claim 14, wherein the instructions further program the one or more processors to:
  receive, from the first courier device, an indicated location of the first courier device based at least in part on a geographic location of the first courier device determined through information from a courier device GPS receiver;
  determine a quantity of items possessed by a courier associated with the first courier device;
  receive, from a first buyer device, an indication of a first delivery location for placing a first order for at least one of the items;
  determine, based at least in part on the received indicated location of the first courier device, that the first courier device is within a threshold delivery travel time to the first delivery location;
  based on determining that the courier possesses the at least one item, send item information to the first buyer device to cause a buyer application on the first buyer device to present, in a user interface, information about the at least one item possessed by the courier and an indication that the at least one item is available to be ordered;
  receive, from the first buyer device, a first order for a first quantity of the at least one item for delivery to the first delivery location;
  determine that the quantity of the at least one item possessed by the courier is greater than or equal to the first quantity;
  send, to the first buyer device, a confirmation of the first order; and
  send, to the first courier device, first order information including an indication of the first delivery location and the first quantity.

20. The one or more non-transitory computer-readable media as recited in claim 14, wherein the instructions further program the one or more processors to:
  receive, from a plurality of courier devices, including the first courier device, associated with a plurality of couriers, respectively, respective electronic communications indicating respective locations of the courier devices based at least in part on respective geographic locations of the plurality of courier devices determined through information from respective courier device GPS receivers;
  receive, from one of the buyer devices, an indication of a delivery location;
  determine, for each of the plurality of courier devices, that a predicted delivery travel time to the indicated delivery location is greater than a threshold delivery travel time; and
  send an indication to the one of the buyer devices that the item is unavailable to be ordered.

* * * * *